(12) United States Patent
Shi et al.

(10) Patent No.: US 7,758,783 B2
(45) Date of Patent: Jul. 20, 2010

(54) CONTINIOUS PRODUCTION OF EXFOLIATED GRAPHITE COMPOSITE COMPOSITIONS AND FLOW FIELD PLATES

(75) Inventors: Jinjun Shi, Columbus, OH (US); Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 513 days.

(21) Appl. No.: 11/901,227

(22) Filed: Sep. 17, 2007

(65) Prior Publication Data
US 2009/0072448 A1 Mar. 19, 2009

(51) Int. Cl.
B29C 43/26 (2006.01)
(52) U.S. Cl. ............... 264/119; 264/29.1; 264/109; 264/122
(58) Field of Classification Search ............ None
See application file for complete search history.

(56) References Cited

U.S. PATENT DOCUMENTS

| | | | |
|---|---|---|---|
| 3,404,061 A * | 10/1968 | Shane et al. ........ 428/143 |
| 3,492,197 A | 1/1970 | Olstowski, et al. |
| 4,265,952 A * | 5/1981 | Caines .............. 138/140 |
| 4,530,949 A | 7/1985 | Atkinson et al. |
| 4,704,231 A | 11/1987 | Chung |
| 4,729,910 A | 3/1988 | Fukuda et al. |
| 4,946,892 A | 8/1990 | Chung |
| 5,300,370 A | 4/1994 | Washington et al. |
| 5,527,363 A | 6/1996 | Wilkinson et al. |
| 5,885,728 A | 3/1999 | Mercuri et al. |
| 6,037,073 A | 3/2000 | Besmann et al. |
| 6,037,074 A | 3/2000 | Mercuri et al. |
| 6,171,720 B1 | 1/2001 | Besmann et al. |
| 6,248,467 B1 | 6/2001 | Wilson et al. |
| 6,432,336 B1 | 8/2002 | Mercuri et al. |
| 6,706,400 B2 | 3/2004 | Mercuri et al. |
| 6,746,771 B2 | 6/2004 | Öttinger et al. |
| 6,881,512 B2 | 4/2005 | Saito et al. |
| 6,939,638 B2 | 9/2005 | Saito et al. |
| 2001/0006263 A1 * | 7/2001 | Hayward ............ 264/29.1 |
| 2001/0046560 A1 | 11/2001 | Fong et al. |
| 2002/0164483 A1 * | 11/2002 | Mercuri et al. ....... 428/408 |

(Continued)

OTHER PUBLICATIONS

U.S. Appl. No. 11/293,540, filed Dec. 5, 2005, Jang.
U.S. Appl. No. 11/293,541, filed Dec. 5, 2005, Jang, et al.
U.S. Appl. No. 11/800,729, filed May 8, 2007, Zhamu, et al.

(Continued)

Primary Examiner—Mary Lynn F Theisen

(57) ABSTRACT

A process of continuously producing a more isotropic, electrically conductive composite composition is provided. The process comprises: (a) continuously supplying a compressible mixture comprising exfoliated graphite worms and a binder or matrix material, wherein the binder or matrix material is in an amount of between 3% and 60% by weight based on the total weight of the mixture; (b) continuously compressing the compressible mixture at a pressure within the range of from about 5 psi or 0.035 MPa to about 50,000 psi or 350 MPa in at least a first direction into a cohered graphite composite compact; and (c) continuously compressing the composite compact in a second direction, different from the first direction, to form the composite composition in a sheet or plate form. The process leads to composite plates with exceptionally high thickness-direction electrical conductivity.

33 Claims, 7 Drawing Sheets

U.S. PATENT DOCUMENTS

2004/0229993 A1   11/2004  Huang et al.
2005/0116376 A1*  6/2005  Egami et al. ................ 264/105
2006/0091573 A1*  5/2006  Calarco et al. ................ 264/41
2007/0015267 A1   1/2007  Da Silva et al.

OTHER PUBLICATIONS

U.S. Appl. No. 11/800,730, filed May 8, 2007, Zhamu, et al.
U.S. Appl. No. 11/807,379, filed May 29, 2007, Zhamu, et al.

* cited by examiner

CONTINIOUS PRODUCTION OF EXFOLIATED GRAPHITE COMPOSITE COMPOSITIONS AND FLOW FIELD PLATES

This invention is based on the research results of a project supported by the US Department of Energy (DOE) SBIR-STTR Program. The US government has certain rights on this invention.

The present application is related to the following co-pending applications: (a) Aruna Zhamu, Jinjun Shi, Jiusheng Guo and Bor Z. Jang, "Exfoliated Graphite Composite Compositions for Fuel Cell Flow Field Plates," U.S. patent application Ser. No. 11/800,729 (May 8, 2007); (b) Aruna Zhamu, Jinjun Shi, Jiusheng Guo and Bor Z. Jang, "Method of Producing Exfoliated Graphite Composite Compositions for Fuel Cell Flow Field Plates," U.S. patent application Ser. No. 11/800,730 (May 8, 2007); and (c) Aruna Zhamu, Jinjun Shi, Jiusheng Guo and Bor Z. Jang, "Laminated Exfoliated Graphite Composite-Metal Compositions for Fuel Cell Flow Field Plate or Bipolar Plate Applications," U.S. patent application Ser. No. 11/807,379 (May 29, 2007).

FIELD OF THE INVENTION

The present invention provides a process of continuously producing a composite composition that can be used to make fuel cell bipolar plates or flow field plates. In particular, the present invention provides a mass production method of manufacturing a highly conducting, less anisotropic composite flow field plate composition that has an exceptionally high electrical conductivity in the plate thickness direction.

BACKGROUND OF THE INVENTION

A fuel cell converts chemical energy into electrical energy and some thermal energy by means of a chemical reaction between a fuel (e.g., hydrogen gas or a hydrogen-containing fluid) and an oxidant (e.g., oxygen). A proton exchange membrane (PEM) fuel cell uses hydrogen or hydrogen-rich reformed gases as the fuel, a direct-methanol fuel cell (DMFC) uses methanol-water solution as the fuel, and a direct ethanol fuel cell (DEFC) uses ethanol-water solution as the fuel, etc. These types of fuel cells that require utilization of a PEM layer as a proton transport electrolyte are collectively referred to as PEM-type fuel cells.

A PEM-type fuel cell is typically composed of a seven-layered structure, including (a) a central PEM electrolyte layer for proton transport; (b) two electro-catalyst layers on the two opposite primary surfaces of the electrolyte membrane; (c) two fuel or gas diffusion electrodes (GDEs, hereinafter also referred to as diffusers) or backing layers stacked on the corresponding electro-catalyst layers (each GDE comprising porous carbon paper or cloth through which reactants and reaction products diffuse in and out of the cell); and (d) two flow field plates (or a bi-polar plate) stacked on the GDEs. The flow field plates are typically made of graphite, metal, or conducting composite materials, which also serve as current collectors. Gas-guiding channels are defined on a GDE facing a flow field plate or, more typically, on a flow field plate surface facing a GDE. Reactants (e.g., $H_2$ or methanol solution) and reaction products (e.g., $CO_2$ at the anode of a DMFC, and water at the cathode side) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling channels and humidifying plates may be added to assist in the operation of a fuel cell stack.

In one common practice, a fuel flow field plate and an oxidant gas flow field plate are separately made and then assembled together to form a bipolar plate (one side of a bipolar plate serving as a negative terminal and the other side as a positive terminal, hence the name). In some cases, an additional separator is sandwiched between the two flow field plates to form a bipolar plate. It would be highly advantageous if the flow filed plates and the separator can be mass-produced into an integrated bipolar plate assembly. This could significantly reduce the overall fuel cell production costs and reduce contact ohmic losses across constituent plate interfaces. The bipolar plate is known to significantly impact the performance, durability, and cost of a fuel cell system. The bipolar plate, which is typically machined from graphite, is one of the most costly components in a PEM fuel cell.

Fluid flow field plates have open-faced channels formed in one or both opposing major surfaces for distributing reactants to the gas diffuser plates, which are the anode and cathode backing layers, typically made of carbon paper or fabric. The open-faced channels also provide passages for the removal of reaction products and depleted reactant streams. Optionally, a bipolar plate may have coolant channels to manage the fuel cell temperature. According to the US Department of Energy (DOE), a bipolar plate should have the following desirable characteristics: high electrical conductivity (e.g., preferably having a conductivity no less than 100 S/cm and specific areal conductivity no less than 200 $S/cm^2$), low permeability to fuel or oxidant fluids, good corrosion resistance, and good structural integrity. The specific areal conductivity is essentially the bipolar plate thickness-direction conductivity divided by the plate thickness. Hence, it is highly desirable to have a thinner plate. Current graphite bipolar plates, typically 3-5 mm thick, should preferably be reduced to below 1 mm and most preferably below 0.5 mm.

Conventional methods of fabricating fluid flow field plates require the engraving or milling of flow channels into the surface of rigid plates formed of a metal, graphite, or carbon-resin composite. Such plates are expensive due to high machining costs. The machining of channels into the graphite plate surfaces causes significant tool wear and requires significant processing times. Metals can be readily shaped into very thin plates, but long-term corrosion is a major concern. A corrosion-resistant coating may be used, but it has to be applied perfectly. The coating may also increase contact resistance.

Alternatively, fluid flow field plates can be made by a lamination process (e.g., U.S. Pat. No. 5,300,370, issued Apr. 5, 1994), wherein an electrically conductive, fluid impermeable separator layer and an electrically conductive stencil layer are consolidated to form one open-faced channel. Presumably, two conductive stencil layers and one separator layer may be laminated to form a bipolar plate. It is often difficult and time-consuming to properly position and align the separator and stencil layers. Die-cutting of stencil layers require a minimum layer thickness, which limits the extent to which fuel cell stack thickness can be reduced. Such laminated fluid flow field assemblies tend to have higher manufacturing costs than integrated plates, due to the number of manufacturing steps associated with forming and consolidating the separate layers. They are also prone to delamination due to poor interfacial adhesion and vastly different coefficients of thermal expansion between a stencil layer (typically a metal) and a separator layer. Corrosion also presents a challenging issue for metal-based bipolar plates in a PEM fuel cell since they are used in an acidic environment.

A variety of composite bipolar plates have been developed, which are mostly made by compression molding of polymer matrices (thermoplastic or thermoset resins) filled with conductive particles such as graphite powders or fibers. Because most polymers have extremely low electronic conductivity, excessive conductive fillers have to be incorporated, resulting in an extremely high viscosity of the filled polymer melt or liquid resin and, hence, making it very difficult to process. Bi-polar plates for use in PEM fuel cells constructed of graphite powder/fiber filled resin composite materials and having gas flow channels are reviewed by Wilson, et al (U.S. Pat. No. 6,248,467, Jun. 19, 2001). Injection-molded composite-based bipolar plates are disclosed by Saito, et al. (U.S. Pat. No. 6,881,512, Apr. 19, 2005 and No. 6,939,638, Sep. 6, 2005). These thermoplastic or thermoset composites exhibit a bulk conductivity significantly lower than 100 S/cm (the US Department of Energy target value), typically not much higher than 10 S/cm.

Besmann, et al. disclosed a carbon/carbon composite-based bipolar plate (U.S. Pat. No. 6,171,720 (Jan. 9, 2001) and No. 6,037,073 (Mar. 14, 2000)). The manufacture process consists of multiple steps, including production of a carbon fiber/phenolic resin preform via slurry molding, followed by a compression-molding step. The molded part is then pyrolyzed at a high temperature (1,500° C.-2,500° C.) to obtain a highly porous carbon/carbon composite. This is followed by chemical vapor infiltration (CVI) of a carbon matrix into this porous structure. It is well-known that CVI is a very time-consuming and energy-intensive process and the resulting carbon/carbon composite, although exhibiting a high electrical conductivity, is very expensive.

Instead of using pyrolyzation and CVI to produce carbon/carbon composites, Huang, et al. (US Patent Application Pub. No. 2004/0229993, Nov. 18, 2004) discloses a process to produce a thermoplastic composite with a high graphite loading. First, polymer fibers, such as thermotropic liquid crystalline polymers or polyester, reinforcing fibers such as glass fibers, and graphite particles are combined with water to form a slurry. The slurry is pumped and deposited onto a sieve screen. The sieve screen serves the function of separating the water from the mixture of polymer fibers, glass fibers and graphite. The mixture forms a wet-lay sheet which is placed in an oven. Upon heating to a temperature sufficient to melt the polymer fibers, the wet-lay sheet is allowed to cool and have the polymer material solidify. Upon solidification, the wet-lay sheet takes the form of a sheet material with reinforcement glass fibers held together by globules of thermoplastic material, and graphite particles adhered to the sheet material by the thermoplastic material. Several of these sheets are then stacked, preferably with additional graphite powder interspersed between sheets, and compression-molded in a hot press. After application of heat and pressure in the press, one or more formed bipolar plates are obtained, where the bipolar plates are a composite of glass fibers, thermoplastic matrix and graphite particles. Clearly, this is also a tedious process which is not amenable to mass production.

Alternatively, fluid flow field plates can be made from an electrically conductive, substantially fluid impermeable material that is sufficiently compressible or moldable so as to permit embossing. Flexible graphite sheet is generally suitable for this purpose because it is relatively impervious to typical fuel cell reactants and coolants and thus is capable of isolating the fuel, oxidant, and coolant fluid streams from each other. It is also compressible and embossing processes may be used to form channels in one or both major surfaces.

The "flexible graphite" is typically obtained in the following manner: Natural graphite particles are treated with an agent that intercalates into the graphite crystal structure (inter-graphene layer spaces) to form a graphite intercalation compound (GIC) or "expandable graphite." Rapid heating of a GIC or expandable graphite to a high temperature, typically 700-1,050° C., results in a large expansion of the graphite crystal structure by typically 80-300 times in the c-axis direction, the direction that is perpendicular to the graphene plane or basal plane of the graphite crystal structure. The exfoliated graphite particles are vermiform in appearance, and are therefore commonly referred to as graphite worms. Hereinafter, the term "exfoliated graphite" will be used interchangeably with the term "expanded graphite" or graphite worms. The worms are typically characterized as having exfoliated flakes that are substantially interconnected. An "exfoliated flake" is typically composed of one or multiple graphene planes (sheets) bonded together by van der Waals forces with an inter-planar spacing of typically from 0.335 (graphite) to 0.6 nm (graphite oxide) between two un-expanded basal planes inside a flake. However, there are pores between exfoliated flakes that are typically between 10 nm and 20 μm wide. These pores make the worms fluffy and compressible. The worms may be re-compressed together into flexible sheets which, unlike the original graphite flakes, can be easily formed and cut into various shapes. These thin sheets (foils or films) are hereinafter referred to as flexible graphite. Flexible graphite can be wound up on a drum to form a roll of thin film, just like a roll of thin plastic film or paper.

Although flexible graphite sheets are highly conductive (in a direction parallel to the sheet plane, but not in the thickness direction), they by themselves may not have sufficient stiffness and must be supported by a core layer or impregnated with a resin. For example, Wilkinson, et al., in U.S. Pat. No. 5,527,363 (Jun. 18, 1996), disclosed a fluid flow field plate comprising a metal sheet interposed between two flexible graphite (FG) sheets having flow channels embossed on a major surface thereof. These FG-metal-FG laminates are also subject to the delamination or blistering problem, which could weaken the plate and may make it more fluid permeable. Delamination or blistering can also cause surface defects that may affect the flow channels on the plate. These problems may be difficult to detect during fabrication and may only emerge at a later date. The vastly different coefficients of thermal expansion (CTE) and elastic constants between a metal and a flexible graphite layer result in many challenging problems. In particular, thermal cycling between frozen and thawed states, as are likely to be encountered in an automobile application of the fuel cell, could result in delamination between a flexible graphite layer and the metal layer.

Alternatively, Mercuri, et al. (e.g., U.S. Pat. No. 5,885,728, Mar. 23, 1999 and U.S. Pat. No. 6,037,074, Mar. 14, 2000) disclosed a resin-impregnated flexible graphite composite. The flexible graphite sheet has embedded therein ceramic or glass fibers extending from its surface into the sheet to increase the resin permeability of the sheet for the preparation of a resin-impregnated flexible graphite bipolar plate. By allowing ceramic or glass fibers to puncture through layers of exfoliated graphite one would also leave these layers vulnerable to gas permeation, thereby significantly reducing the hydrogen and oxygen permeation resistance of a bipolar plate and increasing the chance of dangerous mixing of hydrogen and oxygen inside a fuel cell stack.

What follows is a summary of the state of the art of the resin-impregnated expanded graphite composite, resin-impregnated flexible graphite sheet composite, and methods of producing these composites:

Olstowski, et al. ("Novel Compressed Cohered Graphite Structures and Method of Preparing Same," U.S. Pat. No. 3,492,197, Jan. 27, 1970) provided compressed and resin-bonded forms of expanded vermicular graphite. The resin-bonded composite is obtained by (a) providing a supply of an expanded vermicular graphite having an apparent bulk density of 0.2-2.0 pounds per cubic foot; (b) providing a supply of a bonding agent; (c) blending the expanded vermicular graphite and bonding agent in an amount of 2-35 weight percent bonding agent based on the total weight of the expanded graphite-bonding agent mixture; (d) compressing the mixture at a pressure of 5-50,000 psi in predetermined directions into predetermined forms of cohered graphite; and (e) treating the so-formed composite to activate the bonding agent thereby promoting adhesion within the compact. This invention taught about compressing vermicular-bonding agent mixture in a uniaxial direction to produce a highly anisotropic composite and in bi-axial, tri-axial, cylinder-radial, and isostatic directions to produce less anisotropic or more isotropic composites. However, it failed to teach, implicitly or explicitly, how a desired degree of isotropy could be maintained when the bi-axially, tri-axially, cylinder-radially, and isostatically compressed composite compacts (prior to curing or fusing to consolidate) were re-compressed or molded as a final operation to become a thin composite plate. This thin plate (thinner than 5 mm, preferably thinner than 3 mm, further preferably thinner than 1 mm, and most preferably thinner than 0.5 mm) is for a bipolar plate application. Further, this patent was limited to using a solid bonding agent to begin with the blending process, excluding liquid polymers from the invention due to the perceived notion that these liquid polymers "can prevent formation of highly densified composites." This patent did not teach how bi-axial, tri-axial, cylinder-radial, and isostatic compressions could be accomplished in a real manufacturing environment for the mass production of less anisotropic composites. Furthermore, the method disclosed in this patent entailed first exfoliating graphite to obtain graphite worms and then mixing graphite worms with a bonding agent in a fine solid powder form. Once the graphite worms are formed, it would be very difficult to mix the worms with fine solid particles in a homogeneous manner without breaking up or significantly disturbing the continuous network of electron-transport paths (interconnected graphite flakes).

Caines ("Vermicular Expanded Graphite Composite Materials," U.S. Pat. No. 4,265,952, May 5, 1981) disclosed an expanded graphite composite containing a corrosion resistant resin (e.g., polytetrafluoroethylene, PTFE). The composite was prepared by blending vermicular graphite with a suspension of fine solid resin particles in a carrier liquid medium, vaporizing the carrier, and heating the composite material to sinter the resin. No electrical property of the resulting composite was reported.

Atkinson, et al. ("Housing for Electrical or Electronic Equipment," U.S. Pat. No. 4,530,949, Jul. 23, 1985) provided a low-density composite composition consisting of exfoliated graphite and a thermosetting resin binder. The density (<0.1 $gm/cm^3$) and the electrical conductivity (0.1 S/cm) values are relatively low.

Fukuda, et al. ("Reinforced Flexible Graphite Sheet," U.S. Pat. No. 4,729,910, Mar. 8, 1988) disclosed a process of producing thermosetting resin reinforced flexible graphite sheets. The process involved subjecting both the flexible graphite sheet and a phenolic resin solution to a preliminary de-aeration treatment prior to immersing the flexible graphite sheet in the resin solution. No electrical conductivity data was offered.

Chung provided a low-density (0.7 $gm/cm^3$) exfoliated flexible graphite flake-reinforced composite with a conductivity of 2 S/cm (Chung, "Low-Density Graphite-Polymer Electrical Conductor," U.S. Pat. No. 4,704,231, Nov. 3, 1987). Chung also provided an in-situ exfoliation method of producing graphite flake-reinforced epoxy composites ("Composites of In-Situ Exfoliated Graphite," U.S. Pat. No. 4,946,892, Aug. 7, 1990).

Fong, et al. ("Methacrylate Impregnated Carbonaceous Parts," U.S. patent application Ser. No. 09/896,178, filed on Jun. 29, 2001 (Pub. No. US 2001/0046560, Pub date Nov. 29, 2001)) disclosed a method of impregnating a highly porous carbon material with a methacrylate polymer. No electrical conductivity data was provided.

Öttinger, et al. ("Impregnated Bodies Made of Expanded Graphite, Process for Producing Such Bodies and Sealing Elements, Fuel Cell Components and Heat-Conducting Elements Formed of the Bodies," U.S. Pat. No. 6,746,771, Jun. 8, 2004) provided composites of expanded graphite impregnated with isocyanate or epoxy resins. The method involved soaking expanded graphite with a low-viscosity, polymerizing resin. The achievable electrical conductivity of the resulting composites appears to be in the range of 2-10 S/cm.

Da Silva, et al. ("Method for Producing Composite Objects Using Expanded Graphite and Vermiculite," U.S. patent application Ser. No. 10/574,803 filed on Oct. 8, 2004 (Pub. No. US 2007/0015267, Pub date Jan. 18, 2007)) disclosed a method of producing s composite object consisting of at least two distinct parts.

Mercuri, et al. ("Flexible Graphite Article and Method of Manufacture," U.S. Pat. No. 6,432,336, Aug. 13, 2002 and No. 6,706,400, Mar. 16, 2004) disclosed a resin-impregnated flexible graphite sheet exhibiting enhanced isotropy and a method of producing resin-impregnated flexible graphite sheet. The method includes the steps of (i) reacting raw natural graphite flake-like particles with a liquid intercalant solution to form intercalated graphite particles; (ii) exposing the intercalated graphite particles to a temperature of at least about 700° C. to expand the intercalated graphite particles to form a stream of exfoliated graphite particles; (iii) continuously compressing the stream of exfoliated graphite particles into a continuous coherent self-supporting mat of flexible graphite; (iv) continuously contacting the flexible graphite mat with liquid resin and impregnating the mat with liquid resin; and (v) continuously calendering the flexible graphite mat to increase the density thereof to form a continuous flexible graphite sheet having a thickness of no more than about 1.0 inch.

It is of interest to note that this process disclosed by Mercuri, et al. involves compressing the exfoliated graphite into a flat mat prior to impregnating the mat with a resin. This sequence is disadvantageous in that the re-compressed flexible graphite, being much denser, is less permeable to resin impregnation. Furthermore, a uniaxial re-compression of the exfoliated graphite prior to resin impregnation tends to align or orientate the graphite flakes along the graphite sheet plane direction (perpendicular to the re-compression vector), resulting in a more anisotropic flexible graphite sheet composite. Once these flakes were well-aligned in a sheet to form a highly cohered mat, their orientations could no longer be changed during subsequent resin impregnation and molding operations. Furthermore, no attempt was made to re-compress the mat in different directions. Thin graphite flakes are essentially single crystals with the flake plane parallel to the basal plane and, hence, exhibit a high electrical conductivity along thin flake plane directions and much lower conductivity along the thickness direction, or c-axis direction. Consequently, the bipolar plates prepared by using the Mercuri process are not expected to have a high thickness-direction conductivity.

The resin-impregnated flexible graphite sheet exhibiting enhanced isotropy as disclosed by Mercuri, et al. (U.S. Pat. No. 6,706,400) was said to contain interlocked particles of expanded graphite. A portion of these interlocked particles of expanded graphite was substantially unaligned with the opposed planar surfaces. However, Mercuri, et al. did not fairly specify how these unaligned graphite flakes were obtained. Presumably, this could be achieved by mixing large particles of exfoliated graphite with smaller particles of exfoliated graphite, as implied in a Mercuri's earlier patent (U.S. Pat. No. 5,846,459, Dec. 8, 1998). The trade literature published by GrafTech (assignee of Mercuri's patents) indicates the electrical resistivity of bipolar plates in the X-Y plane as 7 μOhm-m (in-plane conductivity=1428 S/cm) and in the Z-direction as 300 μOhm-m (thickness-direction conductivity=33 S/cm). The thickness-direction conductivity is unsatisfactory.

In addition to exhibiting high electrical conductivity, the flow field plate or bipolar plate should be constructed from inexpensive starting materials, materials that are easily formed into any plate configuration, preferably using a continuous molding process, and materials that are corrosion resistant in low temperature fuel cells and that do not require further processing such as high temperature pyrolyzation treatments. The above review clearly indicates that prior art bipolar plate material compositions and processes have not provided a satisfactory solution for the fuel cell industry.

Accordingly, an object of the present invention is to provide a method of continuously producing an exfoliated graphite composite composition that exhibits a relatively high thickness-direction conductivity.

Another object of the present invention is to provide a process of continuously producing a composite composition that can be easily molded or embossed into a flow field plate or bipolar plate.

Still another object of the present invention is to provide a continuous process of producing an exfoliated graphite composite that is intrinsically less anisotropic.

Yet another object of the present invention is to provide a process for producing exfoliated graphite composites with enhanced isotropy. Such a process can be continuous, automated, and adaptable for mass production of bipolar plates.

SUMMARY OF THE INVENTION

This invention provides a continues process of producing an electrically conductive, less anisotropic, and structurally sound composite composition and related fuel cell flow field plates or bipolar plates. The composition comprises: (a) expanded or exfoliated graphite; (b) optional particles of non-expandable graphite or carbon, wherein these particles are between 3% and 60% by weight based on the total weight of the particles and the expanded graphite; and (c) a binder or matrix material to bond the expanded graphite and the particles of non-expanded graphite or carbon for forming a highly conductive composite, wherein the binder or matrix material is between 3% and 60% by weight based on the total composite composition weight. The composite plate exhibits a thickness-direction conductivity typically greater than 35 S/cm, more typically greater than 50 S/cm, most typically greater than 100 S/cm, and a thickness-direction specific areal conductivity greater than 200 S/cm$^2$, more typically greater than 500-1,500 S/cm$^2$.

One preferred embodiment of the present invention is a continuous process of producing an electrically conductive composite composition. The process includes the following steps: (a) continuously supplying a compressible mixture comprising exfoliated graphite worms and a binder or matrix material, wherein the binder or matrix material is in an amount of between 3% and 60% by weight based on the total weight of the mixture; (b) continuously compressing said compressible mixture at a pressure within the range of from about 5 psi (0.035 MPa) to about 50,000 psi (350 MPa) in at least a first direction into a cohered graphite composite compact; and (c) continuously compressing the composite compact in a second direction, different from the first direction, to form the composite composition in a sheet or plate form. Step (a) may comprise: (i) continuously supplying a powder mixture of expandable graphite and a binder or matrix material; and (ii) exposing the powder mixture to a temperature sufficient for exfoliating the expandable graphite to obtain the compressible mixture. Alternatively, step (a) may comprise: (i) continuously providing a supply of exfoliated graphite; and (ii) impregnating the exfoliated graphite with a binder or matrix material to obtain the compressible mixture.

Preferably, step (b) comprises an operation selected from (A) compressions in two mutually perpendicular directions; (B) compressions in three mutually perpendicular directions; (C) compression in a cylindrically radial direction; or (D) isostatic compression.

In one preferred route, step (c) comprises calendering the composite compact into a sheet or plate form and, further preferably, comprises another step of continuously collecting the composite sheet on a winding roll to produce roll goods (e.g., rolls of un-cured or partially cured resin-impregnated, recompressed graphite worms). These impregnated worms are composite precursors that can be later shaped and cured into useful products, such as fuel cell bipolar plates and battery current collectors.

Alternatively, in another preferred route, the composite compact, after compression in a second direction, may be directly cured and shaped into a useful product. Hence, the process comprises a step of treating the composite compact to activate the binder or matrix material thereby promoting adhesion within the composite to produce a consolidated composite composition. The step of treating comprises heating, exposing to a high energy radiation, molding, embossing, impressing, or a combination thereof.

The binder or matrix material may comprise a polymer, ceramic, glass, metal, carbon, polymeric carbon, asphalt, tar, coal tar pitch, petroleum pitch, mesophase pitch, or a combination thereof. A polymer may be selected from the group consisting of polyethylene, polypropylene, nylon, polyesters, polytetrafluoroethylene, polyvinylidene fluoride, fluoro polymers, polyacrylonitrile, acrylic resins, epoxides, polyimide, bismale imide, phenol formaldehydes, vinyl ester, isocyanate resins, and combinations thereof.

The binder or matrix material may comprise a char-yielding material and the process further comprises a step of baking or pyrolizing said composite at a temperature for a period of time sufficient to convert said char-yielding material into carbon or graphite. The char-yielding material is selected from the group consisting of asphalt, tar, sugars, phenolic resins, coal tar pitches, petroleum pitches, mesophase pitches, saccharides, organic polymers, and combinations thereof.

Exfoliated graphite worms may be obtained from intercalation and exfoliation of a graphite material selected from natural graphite, synthetical graphite, highly oriented pyrolytic graphite, graphite fiber, graphitic nano-fiber, spheroidal graphite, meso-carbon micro-bead, graphite oxide, graphite fluoride, chemically modified graphite, or a combination thereof.

The compressible mixture may further comprise an isotropy-promoting agent selected from the group consisting of non-expandable graphite particles, spheroidal graphite particles, meso-carbon micro-beads, carbon blacks, graphite or carbon fibers, graphite or carbon nano-fibers, nano-tubes, glass fibers, ceramic fibers, polymer fibers, metal fibers, metal particles, polymer particles, organic particles, inorganic particles, and combinations thereof. Calendering and other type of shaping operation, such as impression, embossing, or compression molding, to form a flow field plate or bipolar plate, could bring the final composite plate back to a less isotropic state (as compared to the composition prior to this final shaping operation). The presence of a non-expandable powder component (e.g., fine particles of natural graphite) serves to eliminate or reduce this further anisotropy induced by the final shaping operation.

Another preferred embodiment of the present invention is a process of continuously producing a more isotropic, electrically conductive composite composition. The process comprises: (a) continuously supplying a compressible mixture of expanded or exfoliated graphite flakes, a non-expandable graphite or carbon powder component, and a binder or matrix material, wherein the non-expandable graphite or carbon powder component is in an amount of between 3% and 60% by weight and the binder or matrix material is in an amount of between 60% and 10% by weight based on the total weight of the compressible mixture; (b) continuously compressing the compressible mixture at a pressure within the range of from about 5 psi (0.035 MPa) to about 50,000 psi (350 MPa) in at least a first direction into a cohered graphite composite compact; and (c) continuously compressing the composite compact in a second direction, different from the first direction, to form the composite composition in a sheet or plate form.

Step (a) may comprise continuously supplying expanded or exfoliated graphite flakes and mixing the exfoliated graphite flakes with non-expandable graphite or carbon particles and a binder or matrix material, in sequence or concurrently. Alternatively, step (a) may comprises: (i) continuously supplying a powder mixture of expandable graphite, non-expandable graphite or carbon particles, and a binder or matrix material; and (ii) exposing the powder mixture to a temperature sufficient for exfoliating the expandable graphite to obtain the compressible mixture. Further alternatively, step (a) may comprise (i) continuously supplying a blend of expanded or exfoliated graphite flakes and non-expandable graphite or carbon particles and (ii) impregnating the blend with a binder or matrix material. The step of impregnating comprises impregnating the blend with a first component of a two-component or multiple-component thermosetting or polymerizing resin and then impregnating the blend with a second component of the resin. Preferably, the step of impregnating comprises impregnating the blend with a mixture of a volatile diluent and a first component of a two-component or multiple-component thermosetting or polymerizing resin, removing the volatile diluent, and then impregnating the blend with a second component of the resin. The volatile diluent is used to reduce the viscosity or promote wetting and impregnation of exfoliated graphite worms or flakes by the resin. The resin may be epoxy resin and the first component comprises a curing agent or hardener.

Again, step (b) may comprise an operation selected from (i) compressions in two mutually perpendicular directions; (ii) compressions in three mutually perpendicular directions; (iii) compression in a cylindrically radial direction; or (iv) isostatic compression. Step (c) may comprise calendering the composite compact into a sheet or plate form, which can be continuously collected on a winding roller to produce roll goods (e.g., rolls of un-cured or partially cured resin-impregnated, recompressed graphite worms). These impregnated worms are composite precursors that can be later shaped and cured into useful products, such as fuel cell bipolar plates and battery current collectors. Alternatively, in another preferred route, the composite compact, after compression in a second direction, may be directly cured and shaped into a useful product. Hence, the process comprises a step of treating the composite compact to activate the binder or matrix material thereby promoting adhesion within the composite to produce a consolidated composite composition. The step of treating comprises heating, exposing to a high energy radiation, molding, embossing, impressing, or a combination thereof.

It may be noted that the US Department of Energy (DOE) target for composite bipolar plates includes a thickness-direction electrical conductivity of 100 S/cm or an areal conductivity of 200 S/cm$^2$, where the areal conductivity is essentially the ratio of the thickness-direction conductivity to the plate thickness. This implies that a thinner plate has a higher areal conductivity, given the same thickness-direction conductivity. One of the advantages of the presently invented composite composition is the notion that this composition can be prepared in such a manner that the resulting composite plate can be as thin as 0.2 mm or thinner, in sharp contrast to the conventional graphite bipolar plates which typically have a thickness of 3-5 mm. This, when coupled with the fact that bipolar plates typically occupy nearly 90% of the total fuel cell stack thickness, implies that our technology enables the fuel cell stack size to be reduced dramatically. The resulting plates have electrical conductivities far exceeding the DOE target values, which was an original objective of the DOE-sponsored research and development work that resulted in the present invention.

DETAILED DESCRIPTION OF THE INVENTION

Figure 1A:
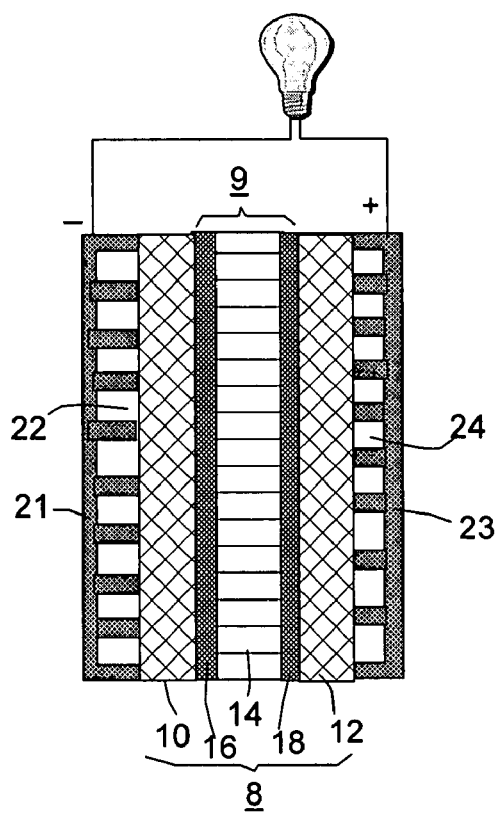
FIG. 1: (A) A sectional view of a prior art PEM fuel cell consisting of a membrane electrode assembly (MEA) sandwiched between two flow field plates 21, 23; and (B) A sectional view of a fuel cell stack consisting of two fuel cell units connected in series through a bipolar plate 19.

A prior art fuel cell, as shown in FIG. 1(A), typically comprises a membrane electrode assembly 8, which comprises a proton exchange membrane 14 (PEM), an anode backing layer 10 connected to one face of the PEM 14, and a cathode backing layer 12 connected to the opposite face of PEM 14. Anode backing layer 10 is also referred to as a fluid diffusion layer or diffuser, typically made of carbon paper or carbon cloth. A platinum/ruthenium electro-catalytic film 16 is positioned at the interface between the anode backing layer and PEM 14 for promoting oxidation of the methanol fuel. Similarly, at the cathode side, there are a backing layer or diffuser 12 (e.g., carbon paper or carbon cloth) and a platinum electro-catalytic film 18 positioned at the interface between the cathode backing layer and PEM 14 for promoting reduction of the oxidant.

In practice, the proton exchange membrane in a PEM-based fuel cell is typically coated on both sides with a catalyst (e.g., Pt/Ru or Pt) to form a catalyst-coated membrane 9 (CCM). The CCM layer 9 is then sandwiched between an anode backing layer 10 (diffuser) and a cathode backing layer 12 (diffuser). The resulting five-layer assembly is called a membrane electrode assembly 8 (MEA). Although some fuel cell workers sometimes refer to CCM as a MEA, we prefer to take the MEA to mean a five-layer configuration: anode backing layer, anode catalyst layer, PEM, cathode catalyst layer, and cathode backing layer.

The fuel cell also comprises a pair of fluid distribution plates (also referred to as fluid flow field plates) 21 and 23, which are positioned on opposite sides of membrane electrode assembly 8. Plate 21, which serves as a fuel distribution plate, is shaped to define fuel flow channels 22 facing towards anode diffuser 10. Channels 22 are designed to uniformly deliver the fuel to the diffuser, which transports the fuel to the anode catalyst layer 16. An input port and an output port (not shown), being in fluid communication with channels 22, may also be provided in flow field plate 21 so that carbon dioxide (in a DMFC) can be withdrawn from channels 22.

Figure 1B:
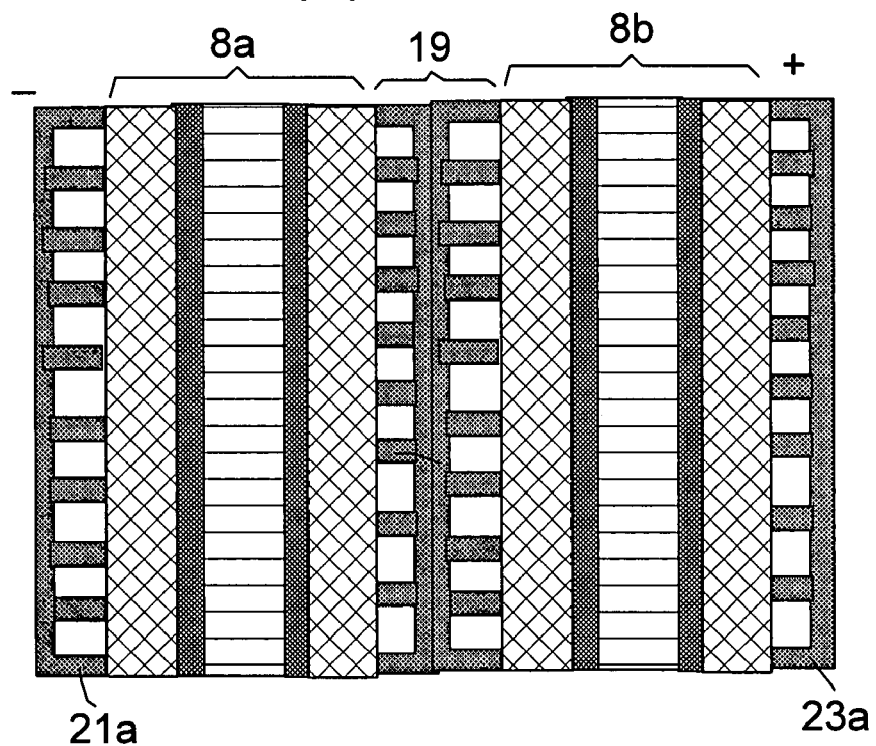

Flow field plate 23 is shaped to include fluid channels 24 for passage of a quantity of gaseous oxygen (or air). An input port and an output port (not shown) are provided in plate 23, which are in fluid communication with channels 24 so that oxygen (or air) can be transported through the input port to the cathode diffuser 12 and cathode catalyst layer 18, and water and excess oxygen (or air) can be withdrawn from channels 24 through the output port. Plate 23 is electrically conductive and in electrical contact with cathode diffuser 12. It can be used as a uni-polar plate (the positive terminal of the electrical current generated by the fuel cell unit) or as a part of a bi-polar plate (if integrated with fuel flow field plate 21). Shown in FIG. 1(B) is a fuel cell stack that consists of two fuel cell units. On the two opposite sides of the stack are two separate flow field plates 21*a*, 23*a*. Between the two MEAs (8*a* and 8*b*) is a bipolar plate 19, which can be viewed as two flow field plates integrated into one single component.

As indicated earlier, bipolar plates can be made from an electrically conductive flexible graphite sheet, which is then impregnated with a resin (e.g., Mercuri, et al., U.S. Pat. No. 6,432,336, Aug. 13, 2002 and No. 6,706,400, Mar. 16, 2004), as schematically shown in FIG. 2(*a*). Flexible graphite sheets are compressible and embossing processes may be used to form channels in one or both major surfaces of a sheet. Conventionally, flexible graphite is obtained first by intercalating graphite with an intercalating agent (also referred to as an intercalate or intercalant) to form a graphite intercalation compound (GIC). Then, the GIC is exposed to a thermal shock at a temperature of 700-1,050° C. for a short duration of time (20-60 seconds) to expand or exfoliate graphite. The exfoliation is characterized by an expansion of graphite particles up to a ratio of typically 80-300 times in the c-axis direction perpendicular to the graphene or basal plane of the graphite crystal structure. The exfoliated graphite particles are vermiform in appearance, and are therefore commonly referred to as worms. The worm is essentially a network of interconnected, thin graphite flakes with pores present between flakes. In this context, an exfoliated flake is a thin layer of graphite basal planes or graphene planes bonded together through van der Waals forces. The flake can be as thin as one graphene plane or hundreds pf such planes stacked together. The inter-flake pores makes the worms compressible. The worms may be re-compressed together into flexible sheets which are characterized by having most of the graphite flakes oriented parallel to the two opposed exterior surfaces, which are perpendicular to the c-axis. These thin sheets (foils or films) are referred to as flexible graphite. Flexible graphite can be wound up on a drum to form a roll of thin film, just like a roll of thin plastic film or paper. Although a flexible graphite sheet is typically highly conductive along the sheet plane directions (in-plane conductivity of 1,300 S/cm), their thickness-direction conductivity is rather poor (reported to be up to only approximately 15 S/cm). The anisotropy ratio, the ratio of highest conductivity to lowest conductivity values, is as high as 1,300/15=86/1 (often higher than this value).

The present invention provides a process of continuously producing a highly conductive, less anisotropic composite composition that is based on novelly re-compressed exfoliated graphite (combined with a binder or matrix material) that can be easily molded into a flow field plate or bipolar plate. The resulting composite plate exhibits a thickness-direction conductivity typically greater than 35 S/cm, more typically greater than 50 S/cm, often greater than 100 S/cm, and in many cases, greater than 200 S/cm. These impressive conductivity values hitherto have not been known to be achievable with prior art resin-impregnated flexible graphite composites.

In one preferred embodiment of the present invention, the continuous process of producing an electrically conductive composite composition includes the following steps (schematically shown in FIG. 2(*b*)): (a) continuously supplying a compressible mixture comprising exfoliated graphite worms and a binder or matrix material, wherein the binder or matrix material is in an amount of between 3% and 60% by weight based on the total weight of the mixture; (b) continuously compressing said compressible mixture at a pressure within the range of from about 5 psi (0.035 MPa) to about 50,000 psi (350 MPa) in at least a first direction into a cohered graphite composite compact; and (c) continuously compressing the composite compact in a second direction, different from the first direction, to form the composite composition in a sheet or plate form. In this Approach 1, step (a) may comprise: (i) continuously supplying a powder mixture of expandable graphite and a binder or matrix material; and (ii) exposing the powder mixture to a temperature sufficient for exfoliating the expandable graphite to obtain the compressible mixture. Alternatively, step (a) may comprise: (i) continuously providing a supply of exfoliated graphite; and (ii) impregnating the exfoliated graphite with a binder or matrix material to obtain the compressible mixture.

Preferably, step (b) comprises an operation selected from (A) compressions in two mutually perpendicular directions; (B) compressions in three mutually perpendicular directions; (C) compression in a cylindrically radial direction; or (D) isostatic compression. Herein, the compression in a cylindrically radial direction means holding the compressible material inside a rubber-like cylindrical chamber and hydrostatically compressing the rubber in radial directions while maintaining the two cylinder end plates at a fixed separation. It may be noted that Olstowski, et al. (U.S. Pat. No. 3,492, 197) disclosed the aforementioned operations could be used to produce cohered exfoliated graphite composites (FIG. 2(a)). However, Olstowski, et al. did not suggest, implicitly or explicitly, that these composites could be formed into thin laminates yet still maintaining a good level of isotropy. They also failed to suggest if and how these operations could be integrated to produce composite plates on a continuous basis for mass production of composite plates (with or without surface flow channels). By contrast, after intensive research and development efforts, we have discovered new ways of mass-producing composite laminate precursors and subsequent bipolar plates continuously, as shown in FIG. 3 and FIG. 4, to be discussed later.

Figure 3:
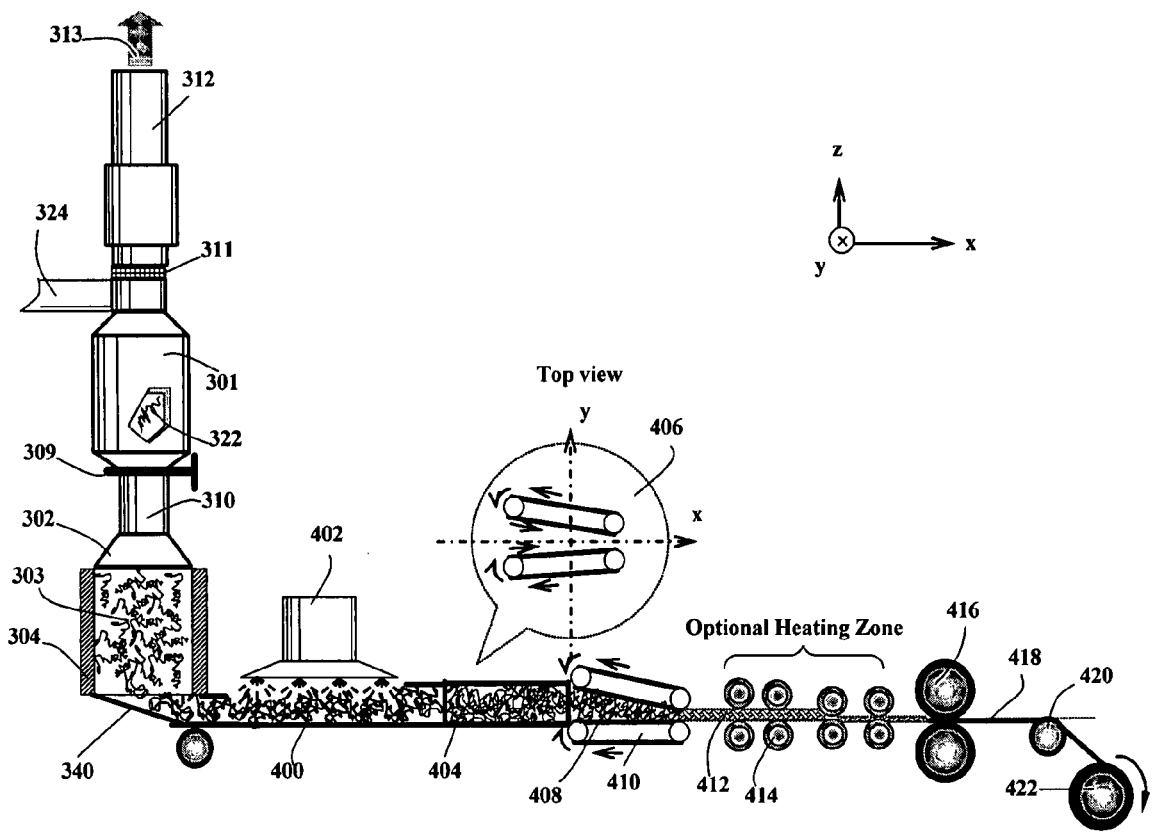
FIG. 3: Schematic of a production system for continuously manufacturing precursor composite compositions (to fuel cell bipolar plates) from raw materials such as expandable graphite, non-expandable powder, and a binder or matrix material.

Referring again to FIG. 2(b), in one preferred route, step (c) comprises calendering the composite compact into a sheet or plate form and, further preferably, comprises another step of continuously collecting the composite sheet on a winding roll to produce roll goods (e.g., rolls of un-cured or partially cured resin-impregnated, recompressed graphite worms, right hand side of FIG. 3)). These impregnated worms are composite precursors that can be later shaped and cured into useful products, such as fuel cell bipolar plates and battery current collectors.

Figure 4:
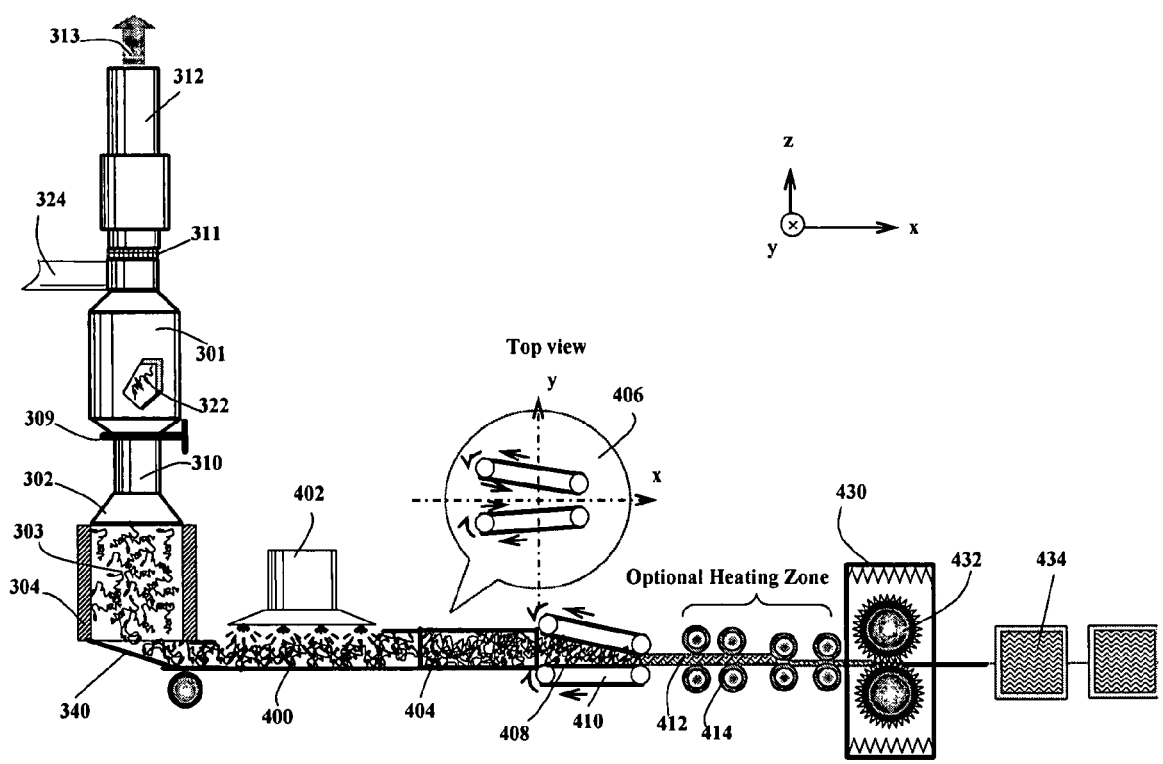
FIG. 4: Schematic of a production system for continuously manufacturing composite fuel cell bipolar plates from raw materials such as expandable graphite, non-expandable powder, and a binder or matrix material. The surface flow channels of bipolar plates can be generated via in-line embossing or matched-die molding.

Alternatively, in another preferred route, the composite compact, after compression in a second direction, may be directly cured and shaped into a useful product (FIG. 4). Hence, the process comprises a step of treating the composite compact to activate the binder or matrix material thereby promoting adhesion within the composite to produce a consolidated composite composition. The step of treating comprises heating, exposing to a high energy radiation, molding, embossing, impressing, or a combination thereof.

The process for continuously producing bipolar plates from exfoliated graphite may be further illustrated by referring to FIG. 3. The exfoliated graphite 322 is continuously transported through a conduit 324 via compressed air into a chamber 301. Exhaust air 313 permeates through a filter 311 and a pipe 312 into the outside atmosphere. The exfoliated graphite 322 may be allowed to drop, intermittently on demand or continuously, through a control valve 309, a conduit 310, and a funnel or hopper 302 into a chamber 304. The material 303 in this chamber is allowed to drop through a conduit 340 onto a conveyor belt driven forward (to the right) by motorized rollers. A binder material dispensing device (e.g., resin sprayer 402) is operated to dispense a binder/matrix material into the worms to produce impregnated worms 400. As an example, the mixture may be uniaxially compressed (e.g., along the Y-direction or transverse direction, wherein the X-axis direction is defined to be parallel to the conveyor belt movement direction in the present case). This may be accomplished by guiding the impregnated worms 400 to enter a space 404 between a pair of roller-driven belts 406 that, through a tapered space design, compresses the impregnated material in the Y-direction while moving in the X-direction. This pre-compressed material enters a tapered space 408 of another pair of roller-driven belts 410 that compresses the material in the Z-direction (vertical direction). The resulting composite compact 412 is then continuously calendered by a series of rollers (e.g., 414 to 416) to form a thin composite compact, which runs over a guiding roll 420 and collected by a winding roller 422. The resulting product is a roll of flexible composite sheet containing, for instance, an un-cured or partially cured resin as a binder or matrix material. This roll of composite precursor material may be stored for later uses or shipped to a manufacturing facility where fuel cell bipolar plates or battery current collectors are made. This process can be automated for the mass production of precursors to composite bipolar plates that are highly conducting and less anisotropic.

In another preferred embodiment of the present invention, as indicated in FIG. 4, the impregnated worms 400 are continuously compressed in the Y-direction and then Z-direction (as explained above in FIG. 3). Instead of being collected as a roll of composite precursor, the calendered composite compact may be fed into the gap between a pair of embossing rollers 432 (or matched molds) inside a heated zone 430 to produce bipolar plates 434 on a continuous basis. Again, the compression in the Y-direction is presented as an example only and there are many ways of pre-compressing the impregnated worms prior to the final shaping operation (e.g., calendering). For instance, the pre-compression may include (i) compressions in two mutually perpendicular directions (e.g., Y- and X-directions); (ii) compressions in three mutually perpendicular directions; (iii) compression in a cylindrically radial direction; or (iv) isostatic compression.

In one preferred embodiment, the present invention provides a process of continuously producing an exfoliated graphite-based composite composition in a sheet-like precursor form or in an embossed or molded bipolar plate or current collector plate form (cured or consolidated). The composition comprises: (a) expanded or exfoliated graphite (including, for instance, expanded graphite, expanded graphite oxide, and expanded graphite fluoride containing less than 20% of non-carbon elements); (b) particles of non-expandable graphite or carbon (e.g., natural graphite particles and carbon black serving as an isotropy-promoting agent), wherein the amount of the non-expandable graphite or carbon is between 3% and 60% by weight based on the total weight of the particles and the expanded graphite together; and (c) a binder or matrix material to bond the expanded graphite and the particles of non-expanded graphite or carbon for forming a highly conductive composite, wherein the binder or matrix material amount is between 3% and 60% by weight based on the total composite composition weight. The composite composition, after molding to form a plate, has a flexural strength typically greater than 50 MPa and can be higher than 100 MPa if other reinforcement components such as graphite fibers are incorporated. It may be noted that the exfoliated graphite in the instant invention comprises exfoliated graphite from a laminar material such as natural graphite, synthetical graphite, highly oriented pyrolytic graphite, graphite fiber, graphitic nano-fiber, graphite oxide, graphite fluoride, chemically modified graphite, or a combination thereof. These species form a laminar or layered structure and can be intercalated and exfoliated.

We have surprisingly found that the presence of non-expandable graphite particles (whether larger or smaller than the exfoliated flake sizes) effectively promotes or facilitates more isotropic orientations of exfoliated flakes, resulting in a much higher thickness-direction conductivity, typically much greater than 50 S/cm. This is a highly desirable feature of a bipolar plate since electrons produced by a fuel cell stack flow along this direction. This increase in thickness-direction conductivity is achieved with a slightly reduced in-plane conductivity, which is still very high (500-1,000 S/cm). The slight reduction in the in-plane conductivity is not a concern for fuel cell bipolar plate applications.

Figure 2A:
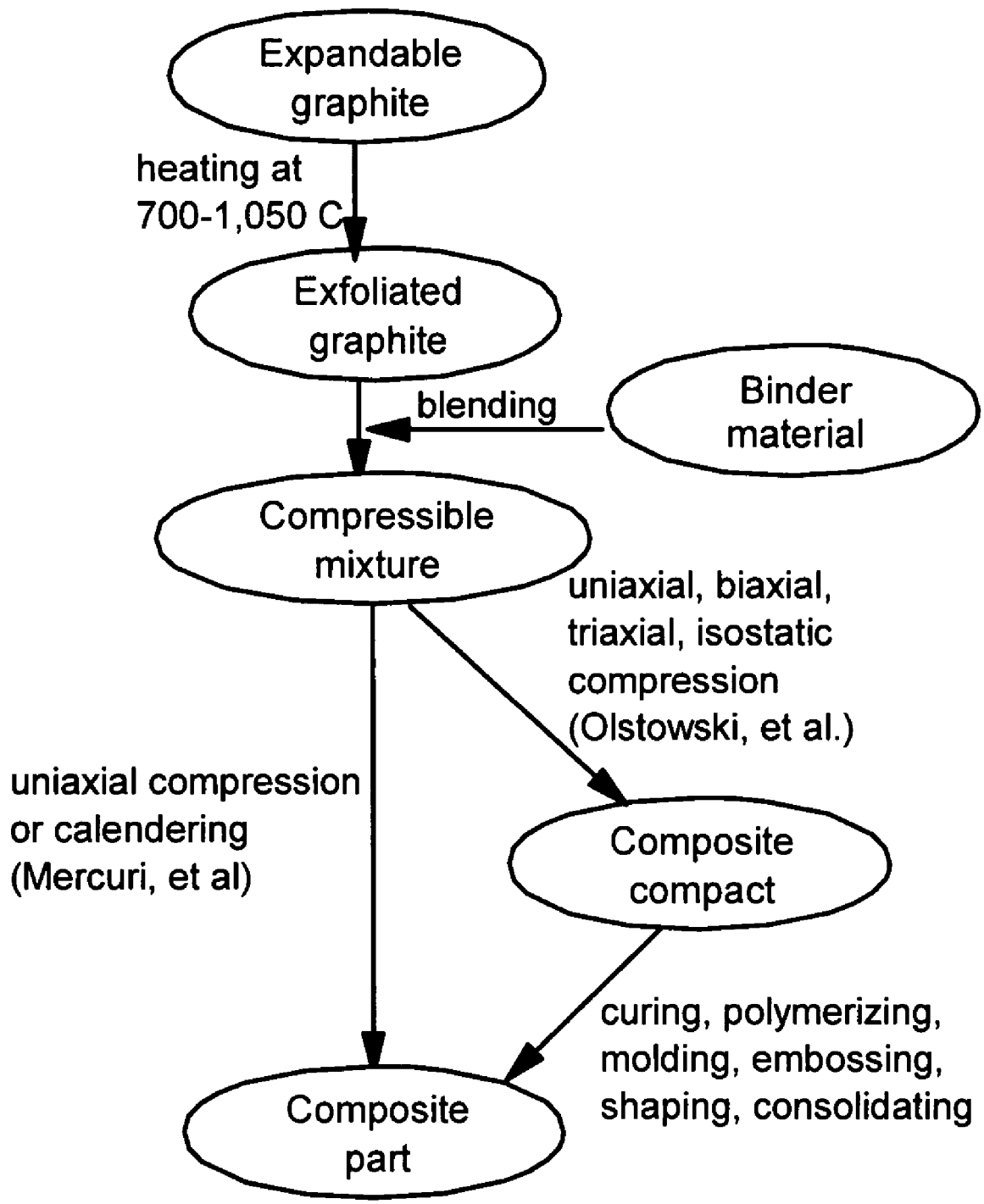
FIG. 2: (a) a flowchart to illustrate a prior art method of producing exfoliated graphite composite; (b) one preferred embodiment of the presently invented process (Approach 1); (c) a second preferred embodiment (Approach 2(*a*) and 2(*b*) of the invented process; and (d) a third preferred embodiment of the presently invented process (Approach 2(*c*)).
Figure 2B:
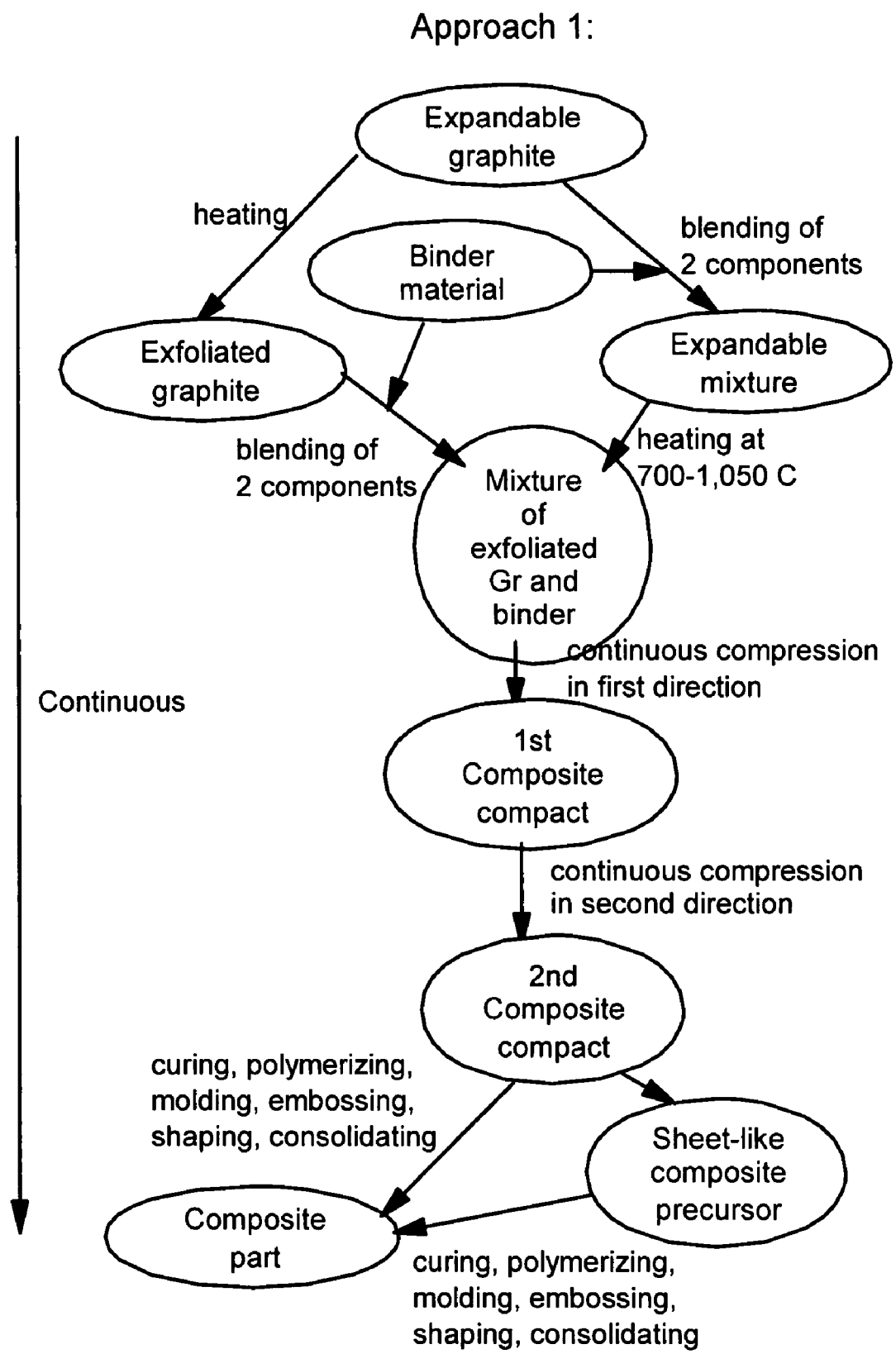
Figure 2C:
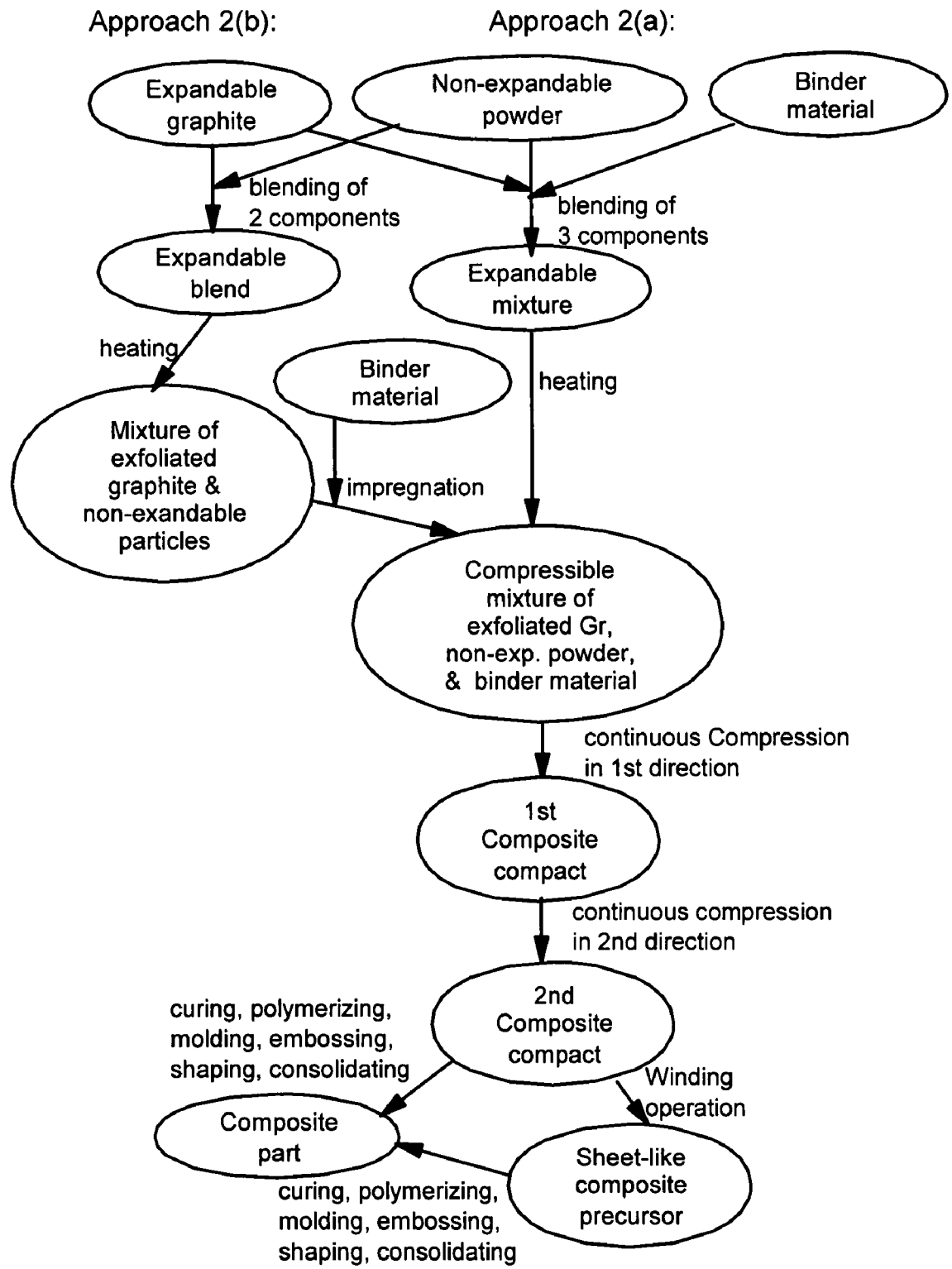

Different variants of the presently invented process involve different ways of combining the three constituents together: the exfoliated graphite (worms or networks of flakes), non-expandable graphite/carbon particles, and the binder/matrix material. In Approach 2(a), as indicated in FIG. 2(c), three components (expandable graphite, non-expandable graphite/ carbon, and a binder/matrix material) are combined first to form an expandable mixture, which is then heated to convert the expandable graphite into exfoliated graphite worms. The resulting mixture of exfoliated graphite worms, non-expandable graphite/carbon particles, and the binder/matrix material, is referred to as a compressible mixture. Alternatively, in Approach 2(b), expandable graphite and non-expandable graphite/carbon particles are mixed together to form an expandable blend, which is heated to produce a mixture of exfoliated graphite worms and non-expandable graphite/carbon particles. This mixture is then impregnated with a binder/matrix material to produce a compressible mixture. In Approach 2(c), as shown in FIG. 2(d), expandable graphite is first heated to obtain exfoliated graphite worms, which are then mixed with non-expandable graphite/carbon particles and a binder/matrix material to from a compressible mixture.

The compressible mixture can further comprise a reinforcement or filler selected from the group consisting of graphite/carbon fiber, graphite/carbon nano-fiber, nano-tube, glass fiber, ceramic fiber, polymer fiber, metal fiber, metal particle, polymer particle, organic particle, inorganic particle, or a combination thereof, wherein the reinforcement or filler is between 0.5% and 30% by weight based on the total weight of expanded graphite, particles of non-expanded graphite or carbon, and reinforcement or filler. In addition to serving as an isotropy-promoting agent, this reinforcement or filler can impart other desired properties to the resulting exfoliated graphite composite. The reinforcement or filler is preferably electrically conductive (e.g., graphite fiber). Although ceramic or glass fibers were incorporated in a prior art resin-impregnated flexible graphite sheet composite, these stiff fibers were used solely or primarily for the purpose of puncturing the exfoliated graphite flakes to enhance resin impregnation (Mercuri, et al., U.S. Pat. No. 5,885,728, Mar. 23, 1999 and U.S. Pat. No. 6,037,074, Mar. 14, 2000). Furthermore, these fibers were not electrically conductive and, hence, could reduce the electrical conductivity of the flexible graphite sheet and its resin-impregnated version. It may be further noted that Mercuri (U.S. Pat. No. 5,846,459, Dec. 8, 1998) did suggest that an amount of exfoliated graphite flakes of smaller dimensions could be mixed with exfoliated graphite flakes of larger sizes to enhance the isotropy of flexible graphite sheets. However, it was not clear if this approach could be adapted to effectively improve the isotropy in the resin-impregnated flexible graphite sheet composite. The best available data published by GrafTech (assignee of Mercuri's patents) indicates a thickness-direction conductivity of 33 S/cm, which is not very impressive. This data seems to suggest that thin flakes of exfoliated graphite are not very effective in enhancing electrical conductivity isotropy of the resulting flexible graphite sheet or resin-impregnated flexible graphite sheet.

Figure 2D:
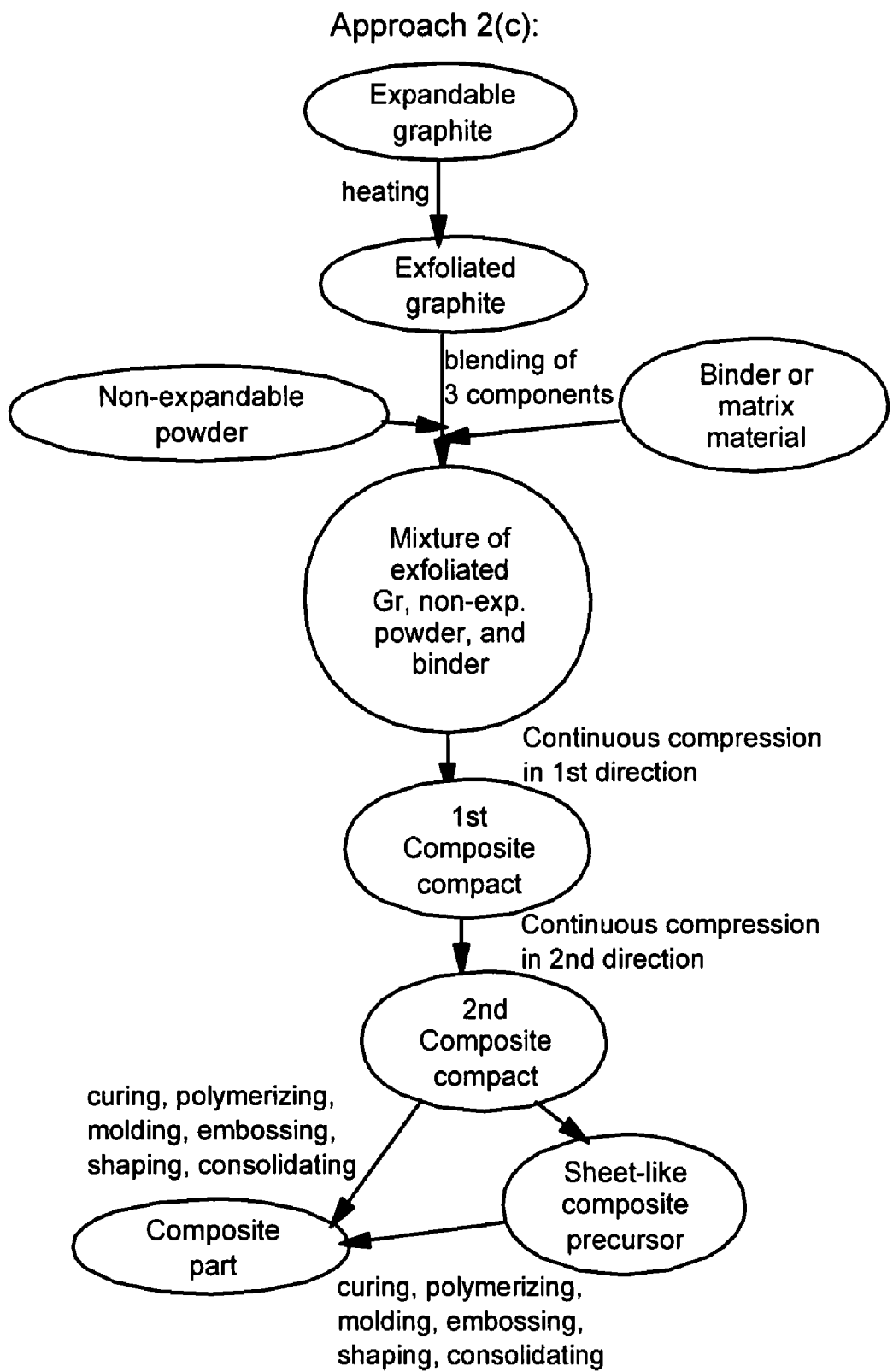

As shown in FIGS. 2(c) and 2(d), the compressible mixture is then subjected to a continuous compression in at least a first direction to produce a first composite compact. The process then entails a compression of the first composite compact in a second direction, different from the first direction, to form a second composite compact. In one preferred embodiment, the second compression comprises calendering the composite compact into a flexible sheet form that can be taken up on a winding roller to produce a roll goods (e.g., a roll of composite precursor containing an un-cured or partially cured resin). This roll of precursor composite may be stored or shipped to a molding facility where composite bipolar plates or battery current collector plates are manufactured. Alternatively, the second composite compact may be directly shaped and consolidated into these plates through in-line matched-die molding, embossing, and/or curing.

Hence, another preferred embodiment of the present invention is a process of continuously producing a more isotropic, electrically conductive composite composition. The process comprises: (a) continuously supplying a compressible mixture of expanded or exfoliated graphite flakes, a non-expandable graphite or carbon powder component, and a binder or matrix material, wherein the non-expandable graphite or carbon powder component is in an amount of between 3% and 60% by weight and said binder or matrix material is in an amount of between 60% and 10% by weight based on the total weight of the compressible mixture; (b) continuously compressing the compressible mixture at a pressure within the range of from about 5 psi (0.035 MPa) to about 50,000 psi (350 MPa) in at least a first direction into a cohered graphite composite compact; and (c) continuously compressing the composite compact in a second direction, different from the first direction, to form the composite composition in a sheet or plate form. In one preferred route, step (c) comprises calendering the composite compact into a sheet or plate form and, further preferably, comprises another step of continuously collecting the composite sheet on a winding roll to produce roll goods (e.g., rolls of un-cured or partially cured resin-impregnated, recompressed graphite worms).

Alternatively, in another preferred route, the composite compact, after compression in a second direction, may be directly cured and shaped into a useful product. Hence, the process comprises a step of treating the composite compact to activate the binder or matrix material thereby promoting adhesion within the composite to produce a consolidated composite composition. The step of treating comprises heating, exposing to a high energy radiation, molding, embossing, impressing, or a combination thereof.

Step (a) may comprise continuously supplying expanded or exfoliated graphite flakes and mixing the exfoliated graphite flakes with non-expandable graphite or carbon particles and a binder or matrix material, in sequence or concurrently. Alternatively, step (a) may comprises: (i) continuously supplying a powder mixture of expandable graphite, non-expandable graphite or carbon particles, and a binder or matrix material; and (ii) exposing the powder mixture to a temperature sufficient for exfoliating the expandable graphite to obtain the compressible mixture. Further alternatively, step (a) may comprise (i) continuously supplying a blend of expanded or exfoliated graphite flakes and non-expandable graphite or carbon particles and (ii) impregnating the blend with a binder or matrix material. The step of impregnating comprises impregnating the blend with a first component of a two-component or multiple-component thermosetting or polymerizing resin and then impregnating the blend with a second component of the resin. Preferably, the step of impregnating comprises impregnating the blend with a mixture of a volatile diluent and a first component of a two-component or multiple-component thermosetting or polymerizing resin, removing the volatile diluent, and then impregnating the blend with a second component of the resin. The volatile diluent is used to reduce the viscosity or promote wetting and impregnation of exfoliated graphite worms or flakes by the resin. The resin may be epoxy resin and the first component comprises a curing agent or hardener.

In the presently invented composite composition, the binder or matrix material may be selected from a polymer, ceramic, glass, metal, carbon, polymeric carbon, asphalt, tar, coal tar pitch, petroleum pitch, mesophase pitch, or a combination thereof. The polymer binder may be preferably selected from the group consisting of polyethylene, polypropylene, nylon, polyesters, polytetrafluoroethylene, polyvinylidene fluoride, fluoro polymers, polyacrylonitrile, acrylic resins, epoxides, polyimide, bismale imide, phenol formaldehydes, vinyl ester, isocyanate resins, and combinations thereof. Many polymers (e.g., phenolic resin and polyacrylonitrile), upon exposure to high temperature (300-1,000° C.), can be converted to polymeric carbons, which are much more conductive than the un-pyrolyzed polymers.

The binder or matrix material may be an inorganic vitreous glass-forming material which contains at least one of the compounds selected from the group consisting of boric oxide, silica, phosphorous pentaoxide, germanium oxides, vanadium pentoxides, and beryllium fluoride. The binder or matrix material may be a glass-forming composition containing at least two oxides selected from the group consisting of silica, aluminum oxide, sodium oxide, potassium oxide, magnesium oxide, cuprous oxide, barium oxide, lead oxide, and boric oxide. The binder may be chosen from metals or metal alloys, which are normally very conductive.

In this method, step (b) may comprise an uniaxial compression, a biaxial compression, a triaxial compression, and/or an isostatic compression. An uniaxial compression alone tends to produce a more anisotropic composite. A biaxial, triaxial, or isostatic compression produces a composite with reduced anisotropy. As a preferred embodiment of the present invention, the composite composition preferably is prescribed to go through a biaxial, triaxial, and/or isostatic compression, prior to a final shaping operation to obtain a bipolar plate. This final shaping operation can involve an uniaxial compression, shearing, impression, embossing, compression molding, or a combination thereof. This operation results in the formation of a flow field plate or bipolar plate typically with flow field channels built onto at least one surface of the plate. The plate is preferably thin, smaller than 1 mm and more preferably thinner than 0.5 mm. This final operation typically involves a combination of uniaxial compression and some shearing, which could bring the final composite plate back to a less isotropic state (as compared to the composition prior to this final shaping operation). We have surprisingly found that the presence of a non-expandable powder component (e.g., fine particles of natural graphite) serves to eliminate or reduce this further anisotropy induced by the final shaping operation. This is a non-trial and non-obvious discovery, achieved only after extensive, in-depth research and development efforts.

By contrast, a prior art method of producing exfoliated graphite composites (Olstowski, et al. U.S. Pat. No. 3,492, 197), schematically shown in FIG. 2(a), includes (a) providing a supply of an expanded vermicular graphite having an apparent bulk density of 0.2-2.0 pounds per cubic foot; (b) providing a supply of a bonding agent; (c) blending the expanded vermicular graphite and bonding agent in an amount of 2-35 weight percent bonding agent based on the total weight of the expanded graphite-bonding agent mixture; (d) compressing the mixture at a pressure of 5-50,000 psi in predetermined directions into predetermined forms of cohered graphite; and (e) treating the so-formed composite to activate the bonding agent thereby promoting adhesion within the compact. This prior art method patently differs from our process (Approach 1 in FIG. 2(b) and Approaches 2(a), 2(b) and 2(c) in FIG. 2(c) and FIG. 2(d)) in the following ways:

(1) Olstowski's method entails the utilization of already-exfoliated vermicular graphite worms and blending the worms with a bonding agent (a binder material). Blending of a fine bonding agent powder with bulky vermicular graphite could be challenging. According to Olstowski's work, presumably the vermicular graphite must have certain pore characteristics, e.g., corresponding to an apparent bulk density of 0.2-2.0 pounds per cubic foot, in order for the bonding agent to properly mix with the exfoliated graphite. By contrast, one version of our Approach 1 involves first mixing expandable graphite (prior to expansion or exfoliation) with a binder material, also in a fine powder form. Since both ingredients are fine solid powders, they can be more uniformly mixed without difficulty. After exfoliation of the expandable graphite, the resulting mixture maintains a good distribution of the binder material (and the non-expandable powder component such as un-intercalated natural graphite particles). Subsequent compression and binder treatments (curing, polymerizing, melting and cooling, etc.) result in a composite of good mechanical integrity.

(2) Olstowski et al. did not use a non-expandable powder component, nor did they recognize the significance of this component in enhancing isotropy of the resulting composite. Although biaxial, triaxial, and isostatic compression were suggested as means of enhancing the isotropy, Olstowski, et al. did not know a non-expandable powder component could further increase the isotropy in samples that have been subjected to compressions in essentially all directions.

(3) The compression operations in predetermined directions were conducted by Olstowski, et al. on relatively thick samples just to prove that compressions in different directions produced varying degrees of anisotropy. They failed to recognize that the formation of a thin bipolar plate from the binder-exfoliated graphite mixture, with or without prior compressions, will have to go through a final shaping operation. This final shaping operation could involve an uniaxial compression and/or some shearing, which could bring the final composite plate back to a less isotropic state. The presence of a non-expandable powder component in our invention serves to eliminate or reduce this problem. The non-expandable powder may have a size larger or smaller than the flake particle size of the exfoliated graphite.

(4) Olstowski et al. did not suggest how the various operations in their method could be executed continuously or in an automated manner. In contrast, we have provided examples of processes and apparatus that can be used to accomplish these tasks.

The binder or matrix material may be a char-yielding material and the method further comprises a step of baking or pyrolizing the composite at a temperature for a period of time sufficient to convert the char-yielding material into carbon or graphite. The char-yielding material may be selected from the group consisting of asphalt, tar, sugars, phenolic resins, coal tar pitches, petroleum pitches, mesophase pitches, saccharides, organic polymers, and combinations thereof.

In a preferred embodiment of Approach 2(b) or 2(c), schematically shown in FIG. 2(c) and FIG. 2(d), respectively, Step (c) comprises impregnating the compressible mixture with a first component of a two-component or multiple-component thermosetting or polymerizing resin and then impregnating the compressible mixture with a second component of the resin. In particular, Step (c) may comprise impregnating the compressible mixture with a mixture of a volatile diluent and a first component of a two-component or multiple-component thermosetting or polymerizing resin, removing the volatile diluent, and then impregnating the compressible mixture with a second component of the resin. A diluent is used to reduce the viscosity and surface energy of the curing agent, promoting surface wetting and impregnation of exfoliated graphite with this curing agent. Once the interior and exterior surfaces of the pores in exfoliated graphite are wetted with the curing agent, subsequent impregnation or infiltration of the resin is essentially spontaneous. This is due to the notion that typically a curing agent is chemically compatible with its matting base resin. Preferably, the resin comprises epoxy resin and the first component of a two-component epoxy system comprises a curing agent or hardener.

Example 1

Polyethylene-Expanded Graphite Composites

A series of composite compacts were prepared as follows:

Sample 1-A: Ultrafine polyethylene (PE) powder, having an average particle size of about 10 μm, was dry-blended with 30% by weight of non-expandable natural graphite particles and 70% by weight of acid-intercalated, expandable graphite (based on the total weight of expandable and non-expandable graphite). The PE amounts were 5, 15, 25, and 50% by weight based on the total weight of the resulting composite composition. The non-expandable graphite was intended for use as an isotropy-promoting agent. The three-component mixture was transported through a quartz tube, which was set at a temperature of 1,100° C. and the residence time of graphite in the heated zone was approximately for 20 seconds. Rapid expansion or exfoliation of the expandable graphite occurred and, surprisingly, the PE did not suffer any significant thermal degradation as would have been expected by polymer scientists. This might have been due to the notion that PE was exposed to high heat for only a very short period of time. The resulting material was a compressible mixture.

Sample 1-B: The compositions and process conditions were the same as Sample 1-A with the exception that there was no non-expandable graphite in 1-B.

Sample 1-C: The compositions and process conditions were the same as Sample 1-A with the exception that PE powder was added after (rather than before) exfoliation of the expandable graphite.

Sample 1-D: The compositions and process conditions were the same as Sample 1-A with the exceptions that there was no non-expandable graphite in the composite and PE powder was added after (rather than before) exfoliation of the expandable graphite. This was based on a prior art approach.

Sample 1-E: The compositions and process conditions were the same as Sample 1-A with the exception that the amount of non-expandable graphite was 20% with the remaining 10% being replaced with short graphite fibers for the purpose of enhancing mechanical strength of the resulting composite plate.

A desired amount of the various PE-graphite blends (compressible blend) was poured into a mold and uniaxially compressed to a pressure of about 5,000 psi (34.5 MPa), heated to 160° C., and then cooled to produce thin, flat plates (approximately 1 mm thick). The electrical properties and flexural strengths of these materials were then measured. The results are summarized in Table 1.

TABLE 1

Conductivity and flexural strength values of exfoliated graphite-PE composites.

| Sample | Weight % PE | In-plane conductivity, S/cm | Thickness-direction conductivity, S/cm | Flexural strength, MPa |
|---|---|---|---|---|
| 1-A | 5 | 1340 | 117 | 18.4 |
|  | 15 | 1210 | 78 | 24.5 |
|  | 25 | 1005 | 76 | 25.1 |
|  | 50 | 156 | 17 | — |
| 1-B | 5 | 1710 | 11.5 | 20.4 |
|  | 15 | 1340 | 13.7 | 30.5 |
|  | 25 | 1120 | 16.5 | 31.2 |
|  | 50 | 85 | 3.3 | — |
| 1-C | 5 | 1338 | 115 | 16.5 |
|  | 15 | 1211 | 77 | 17.5 |
|  | 25 | 1001 | 76 | 17.4 |
|  | 50 | 156 | 16 | — |
| 1-D | 5 | 1703 | 11.4 | 13.5 |
|  | 15 | 1328 | 13.3 | 16.5 |
|  | 25 | 1101 | 15.9 | 17 |
|  | 50 | 79.5 | 3.2 | — |
| 1-E | 5 | 1305 | 108 | 45 |
|  | 15 | 1105 | 76 | 64 |
|  | 25 | 1004 | 72 | 67 |
|  | 50 | 225 | 17 | — |

A comparison of the conductivity data between Sample 1-A and Sample 1-B indicates that Sample 1-A is more isotropic, providing a much higher thickness-direction conductivity. This is due to the presence of non-expandable graphite particles that serves as an isotropy-promoting agent. Sample 1-A appears to be a much better candidate material for bipolar plate applications. A comparison of the flexural strength data between Sample 1-A and Sample 1-C indicates that Sample 1-A provides a higher strength, likely due to the notion that mixing the binder material powder with the expandable graphite (prior to exfoliation) leads to a more homogeneous composite. A comparison of the conductivity data between Sample 1-A and Sample 1-D indicates that Sample 1-A is more isotropic, providing a much higher thickness-direction conductivity, and exhibiting a higher strength. Clearly, the presently invented composition is far superior to the prior art exfoliated graphite composite composition that contains no isotropy-promoting agent in the composite and the binder material was added after (rather than before) exfoliation of the expandable graphite. A comparison of the conductivity data between Sample 1-A and Sample 1-E indicates that Sample 1-E (containing high-strength graphite fibers) exhibits a much higher flexural strength. Furthermore, the addition of graphite fibers did not seem to compromise the electrical conductivity of the resulting composite. This implies that different properties can be tailored independently and this class of composite materials and related processes are versatile.

Example 2

Polyethylene-Expanded Graphite Composites (Bi-Axial and Triaxial Compression)

Sample 2-A is identical to sample 1-A (15% PE) and Sample 2-D is identical to sample 1-D. However, Samples 2-A and 2-D were subjected to bi-axial compression (the first compression vector is defined as the X-axis direction and the second compression vector is the Y-axis direction) at a final pressure of 500 psi and, separately, tri-axial compression (samples compressed in X- and Y-axis directions first, followed by a final Z-axis compression (12,500 psi) to form a thin plate). The samples were consolidated (heated to above 160° C.) and then cooled under a final pressure of 500 psi (sample of biaxial compressions only) and 12,500 psi (triaxial compression sample), respectively. The electrical conductivity values in the three directions of all samples are given in Table 2:

TABLE 2

Electrical conductivity of biaxial and triaxial compression samples.

| Sample | Compression directions | X-axis conduc., S/cm | Y-axis conduc., S/cm | Z-axis conduc., S/cm |
|---|---|---|---|---|
| 2-A | X- and Y-axis | 622 | 660 | 1,010 |
| 2-A | X- and Y-, then Z-axis | 860 | 887 | 355 |
| 2-D | X- and Y-axis | 469 | 490 | 1,220 |
| 2-D | X- and Y-, then Z-axis | 1,320 | 1,340 | 120 |

A comparison of the conductivity data between Sample 2-A and Sample 2-D indicates that Sample 2-A (containing an isotropy-promoting agent) is more isotropic, providing a much higher thickness-direction (Z-direction) conductivity. Both samples show very impressive thickness-direction conductivity values (335 S/cm and 120 S/cm), which are much greater than that of prior art flexible graphite composites (33 S/cm at best).

Sample 3: Exfoliated Graphite-Metal Composite.

Sample 3-A: Ultrafine zinc powder (approximately 220 nm in average diameter) was prepared by using a twin-arc atomization and gas phase condensation process. This powder was dry-blended with 30% by weight of non-expandable natural graphite particles and 70% by weight of acid-intercalated, expandable graphite (based on the total weight of expandable and non-expandable graphite). The Zn amount was approximately 30% by weight based on the total weight of the resulting composite composition. The non-expandable graphite was intended as an isotropy-promoting agent. The three-component mixture was transported through a quartz tube, which was set at a temperature of 1,100° C. and the residence time of graphite in the heated zone was approximately for 20 seconds. Rapid expansion or exfoliation of the expandable graphite occurred. For the preparation of Sample 3-B, the compositions and process conditions were the same as with Sample 3-A with the exception that there was no non-expandable graphite in 3-B. Both mixtures, on a separate basis, were uniaxially compressed in a mold to about 5,000 psi to yield a cohered composite. Then this composite was heated in an inert atmosphere to 425° C., while still under a pressure of approximately 5,000 psi, for 5 minutes and subsequently cooled to room temperature to form a consolidated metal-infiltrated expanded graphite composite plate. The in-plane and thickness-direction conductivity of Sample 3-A are 14,500 S/cm and 350 S/cm, respectively while those of Sample 3-B are 14,670 S/cm and 121 S/cm, respectively.

Example 4

Thermoset Resin-Expanded Graphite Composites

Sample 4-A: First, 30% by weight of non-expandable natural graphite particles and 70% by weight of bromine-intercalated, expandable graphite (based on the total weight of expandable and non-expandable graphite) were dried blended. The non-expandable graphite was intended as an isotropy-promoting agent. The mixture was enclosed in a quartz tube, which was purged with nitrogen gas and then sealed from both ends of the tube with ceramic cloth. The tube was rapidly transferred to the center of a tube furnace preheated to a temperature of 600° C. and maintained at that position for 30 seconds. Rapid expansion or exfoliation of the expandable graphite occurred. The resulting graphite worms were then mixed with 25% by weight of fine phenol-formaldehyde powder, based on the total weight of the resulting composite composition. The resulting mixture was charged into a mold, heated to 200° C., and uniaxially compressed to a pressure of 15,000 psi for one hour and further cured at 270° C. for another hour to form a thin composite plate.

Sample 4-B: The compositions and process conditions were the same as Sample 4-A with the exception that there was no non-expandable graphite in 4-B. The in-plane and thickness-direction conductivity of Sample 4-A are 1,450 S/cm and 81 S/cm, respectively while those of Sample 4-B are 1,467 S/cm and 31 S/cm, respectively. Again, the presence of non-expandable graphite particles did significantly promote isotropy, leading to a better thickness-direction conductivity. With a plate thickness of 0.5 mm, the specific areal conductivity of Sample 4-A is 1620 S/cm$^2$, a very impressive value.

Example 5

Polymeric Carbon-Expanded Graphite Composites

Sample 4-A, retained in a steel mold, was slowly heated to 500° C. for 4 hours and then raised to and maintained at 920° C. for 24 hours in an oxygen-free environment. Phenolic resin, a char-yielding polymer, was carbonized to become a polymeric carbon. The in-plane and thickness-direction conductivity of the carbon-bonded composite are improved to become 1,750 S/cm and 320 S/cm, respectively.

Example 6

Glass-Expanded Graphite Composites

In another embodiment of the instant invention, a glass binder-based vermicular glass with good electrical conductivity, dimensional stability, and corrosion resistance was prepared as follows: About 18 grams of expandable graphite and 7 grams of non-expandable graphite were mixed and then heat-exfoliated at 1,000° C. to obtain an exfoliated graphite-unexpanded graphite mixture. About 22 grams of a commercially available lime glass powder was blended with this mixture by gentle tumbling. The resulting mixture, after heating to 920° C. in a steel mold, was uniaxially compressed to a pressure of about 10,000 psi. Upon cooling back to room temperature, the composite plate exhibits an in-plane conductivity of 950 S/cm and thickness-direction conductivity of 23 S/cm. With a thickness of 1 mm, this plate still provides a specific areal conductivity of 230 S/cm$^2$, exceeding the DOE conductivity requirement for a composite bipolar plate.

Example 7

Epoxy Resin-Bonded Expanded Graphite Composites

Sample 7-A: First, 30% by weight of non-expandable natural graphite particles and 70% by weight of bromine-intercalated, expandable graphite (based on the total weight of expandable and non-expandable graphite) were dried blended. The non-expandable graphite was intended as an isotropy-promoting agent. The mixture was enclosed in a quartz tube, which was purged with nitrogen gas and then sealed from both ends of the tube with ceramic cloth. The tube was rapidly transferred to the center of a tube furnace preheated to a temperature of 600° C. and maintained at that position for 30 seconds. Rapid expansion of the expandable graphite occurred, resulting in a compressible mixture of exfoliated graphite worms and non-expanded graphite.

This compressible mixture was impregnated with a mixture of a volatile diluent (acetone with a quantity 3 times the weight of a curing agent) and the curing agent of a two-component epoxy resin. The diluent was used to reduce the viscosity and surface energy of the curing agent, thereby promoting impregnation and wetting of exfoliated graphite with this curing agent. Upon completion of the impregnation procedure, the volatile diluent was removed under a chemical fume hood. The curing agent-impregnated compressible mixture was then impregnated with the epoxide, the second component of the epoxy resin system. Once the interior and exterior surfaces of the pores in exfoliated graphite were wetted with the curing agent, subsequent impregnation or infiltration of the resin was essentially spontaneous. This is a very effective way of impregnating graphite worms.

Sample 7-B: The compositions and process conditions were the same as Sample 7-A with the exception that there was no non-expandable graphite in 7-B.

Samples 7-A and 7-B were subjected to bi-axial compression (first compression vector is defined as the X-axis direction and second compression vector is the Y-axis direction) at a final pressure of 5,000 psi and, separately, tri-axial compression (samples compressed in X- and Y-axis directions first, followed by a final Z-axis compression (12,500 psi) to form a thin plate). Additionally, a desired amount of both samples was directly compressed uniaxially to form a thin plate. The samples were cured at 160° C. for two hours. The final composite plates contain approximately 17% epoxy resin. The electrical conductivity values in the three directions of all samples are given in Table 3:

TABLE 3

Electrical conductivity of biaxial and triaxial compression samples.

| Sample | Compression directions | X-axis conduc., S/cm | Y-axis conduc., S/cm | Z-axis conduc., S/cm |
|---|---|---|---|---|
| 7-A | X- and Y-axis | 422 | 454 | 1,040 |
|  | X- and Y-, then Z-axis | 923 | 987 | 255 |
|  | Z-axis only | 1450 | 1450 | 145 |
| 7-B | X- and Y-axis | 369 | 390 | 1,220 |
|  | X- and Y-, then Z-axis | 1,050 | 1,074 | 156 |
|  | Z-axis only | 1434 | 1434 | 79 |

The data again demonstrates that non-expandable graphite particles are an effective isotropy-promoting agent, resulting in exceptional thickness-direction conductivity. Pre-compressions in one or two directions (X- and Y-direction), prior to the final shaping operation (Z-direction), provides an effective way of producing exfoliated graphite-based bipolar plates with excellent electrical conductivity properties.

In summary, the present invention provides the fuel cell industry with a highly conductive flow field plate or bipolar plate component. The resulting fuel cell system is of lower costs (due to their amenability to mass production) and better performance (due to lower contact resistance and internal resistance and, hence, higher voltage and power output). The presently invented composite composition has the following additional features and advantages:

(1) This composite composition can be manufactured by using a fast, continuous, and cost-effective process. The process can be automated and adaptable for mass production. The starting materials are relatively inexpensive graphite-based materials. No expensive and tedious process such as chemical vapor infiltration is required. The resulting bipolar plate or flow field plate is of low cost.

(2) The bipolar plate or flow field plate is of excellent structural integrity and is not subject to the delamination problem commonly associated with multi-layer composites induced by the mis-match in coefficients of thermal expansion and elastic constant.

(3) The bipolar plate obtained from the presently invented composition exhibits excellent electrical conductivity that exceeds the target bipolar plate conductivity value set forth by the US Department of Energy for automotive fuel cell applications. As a matter of fact, no prior art flexible graphite-based composite bipolar plates exhibit a thickness-direction electrical conductivity as high as what is obtained with the instant invention.

(4) The composition may be made into a precursor form (without the final shaping operation) for easy storing, shipping, and handling operations. For instance, a resin-bonded exfoliated graphite composition may be stored in a refrigerator, preventing the resin curing reaction from advancing to an undesired extent and, hence, the composition can have a long storage life. The end-user can simply cut the composition into individual pieces, which are molded into bipolar plates when and where the plates are needed. Alternatively, in-line embossing or matched-mold molding may be used to directly produce bipolar plates on an essentially continuous basis.

The invention claimed is:

1. A process of continuously producing a more isotropic, electrically conductive composite composition, said process comprising:
   a) continuously supplying a compressible mixture comprising exfoliated graphite worms and a binder or matrix material, wherein said binder or matrix material is in an amount of between 3% and 60% by weight based on the total weight of the mixture;
   b) continuously compressing said compressible mixture at a pressure within the range of from about 5 psi or 0.035 MPa to about 50,000 psi or 350 MPa in at least a first direction into a cohered graphite composite compact; and
   c) continuously compressing said composite compact in a second direction, different from the first direction, to form said composite composition in a sheet or plate form.

2. The process of claim 1 wherein said step (a) comprises:
   (i) continuously supplying a powder mixture of expandable graphite and a binder or matrix material; and
   (ii) exposing said powder mixture to a temperature sufficient for exfoliating the expandable graphite to obtain said compressible mixture.

3. The process of claim 1 wherein said step (a) comprises: (i) continuously providing a supply of exfoliated graphite; and (ii) impregnating said exfoliated graphite with a binder or matrix material to obtain said compressible mixture.

4. The process of claim 1, wherein said step (b) comprises an operation selected from (A) compressions in two mutually perpendicular directions; (B) compressions in three mutually perpendicular directions; (C) compression in a cylindrically radial direction; or (D) isostatic compression.

5. The process of claim 1, wherein said step (c) comprises calendering said composite compact into said sheet or plate form.

6. The process of claim 1, further comprising a step of continuously collecting said composite sheet on a winding roll.

7. The process of claim 1, further comprising a step of treating said composite sheet or plate to activate the binder or matrix material thereby promoting adhesion within the composite to produce a consolidated composite composition.

8. The process of claim 7, wherein said step of treating comprises heating, exposing to a high energy radiation, molding, embossing, impressing, or a combination thereof.

9. The process of claim 1, wherein said binder or matrix material comprises a polymer, ceramic, glass, metal, carbon, polymeric carbon, asphalt, tar, coal tar pitch, petroleum pitch, mesophase pitch, or a combination thereof.

10. The process as defined in claim 1, wherein said binder or matrix material comprises a polymer selected from the group consisting of polyethylene, polypropylene, nylon, polyesters, polytetrafluoroethylene, polyvinylidene fluoride, fluoro polymers, polyacrylonitrile, acrylic resins, epoxides, polyimide, bismale imide, phenol formaldehydes, vinyl ester, isocyanate resins, and combinations thereof.

11. The process as defined in claim 1, wherein said compressible mixture further comprises an isotropy-promoting agent selected from the group consisting of non-expandable graphite particles, spheroidal graphite particles, meso-carbon micro-beads, carbon blacks, graphite or carbon fibers, graphite or carbon nano-fibers, nano-tubes, glass fibers, ceramic fibers, polymer fibers, metal fibers, metal particles, polymer particles, organic particles, inorganic particles, and combinations thereof.

12. The process as defined in claim 1, wherein said binder or matrix material comprises a char-yielding material and the process further comprises a step of baking or pyrolyzing said composite at a temperature for a period of time sufficient to convert said char-yielding material into carbon or graphite.

13. The process as defined in claim 12, wherein said char-yielding material is selected from the group consisting of asphalt, tar, sugars, phenolic resins, coal tar pitches, petroleum pitches, mesophase pitches, saccharides, organic polymers, and combinations thereof.

14. The process as defined in claim 1 wherein said exfoliated graphite worms are obtained from intercalation and exfoliation of a graphite material selected from natural graphite, synthetical graphite, highly oriented pyrolytic graphite, graphite fiber, graphitic nano-fiber, spheroidal graphite, meso-carbon micro-bead, graphite oxide, graphite fluoride, chemically modified graphite, or a combination thereof.

15. A process of continuously producing a more isotropic, electrically conductive composite composition, said process comprising:
a) continuously supplying a compressible mixture of expanded or exfoliated graphite flakes, a non-expandable graphite or carbon powder component, and a binder or matrix material, wherein said non-expandable graphite or carbon powder component is in an amount of between 3% and 60% by weight and said binder or matrix material is in an amount of between 60% and 10% by weight based on the total weight of the compressible mixture;
b) continuously compressing said compressible mixture at a pressure within the range of from about 5 psi or 0.035 MPa to about 50,000 psi or 350 MPa in at least a first direction into a cohered graphite composite compact; and
c) continuously compressing said composite compact in a second direction, different from the first direction, to form said composite composition in a sheet or plate form.

16. The process of claim 15, wherein step (a) comprises continuously supplying expanded or exfoliated graphite flakes and mixing said exfoliated graphite flakes with non-expandable graphite or carbon particles and a binder or matrix material, in sequence or concurrently.

17. The process of claim 1 wherein said step (a) comprising: (i) continuously supplying a powder mixture of expandable graphite, non-expandable graphite or carbon particles, and a binder or matrix material; and (ii) exposing said powder mixture to a temperature sufficient for exfoliating the expandable graphite to obtain said compressible mixture.

18. The process of claim 15, wherein step (a) comprises (i) continuously supplying a blend of expanded or exfoliated graphite flakes and non-expandable graphite or carbon particles and (ii) impregnating said blend with a binder or matrix material.

19. The process as defined in claim 18, wherein the step of impregnating comprises impregnating the blend with a first component of a two-component or multiple-component thermosetting or polymerizing resin and then impregnating said blend with a second component of said resin.

20. The process as defined in claim 18, wherein the step of impregnating comprises impregnating said blend with a mixture of a volatile diluent and a first component of a two-component or multiple-component thermosetting or polymerizing resin, removing said volatile diluent, and then impregnating said blend with a second component of said resin.

21. The method as defined in claim 20, wherein said resin comprises epoxy resin and said first component comprises a curing agent or hardener.

22. The process of claim 15, wherein said step (b) comprises an operation selected from (A) compressions in two mutually perpendicular directions; (B) compressions in three mutually perpendicular directions; (C) compression in a cylindrically radial direction; or (D) isostatic compression.

23. The process of claim 15, wherein said step (c) comprises calendering said composite compact into said sheet or plate form.

24. The process of claim 15, further comprising a step of continuously collecting said composite sheet on a winding roll.

25. The process of claim 15, further comprising a step of treating said composite sheet or plate to activate the binder or matrix material thereby promoting adhesion within the composite to produce a consolidated composite composition.

26. The process of claim 25, wherein said step of treating comprises heating, exposing to a high energy radiation, molding, embossing, impressing, or a combination thereof.

27. The process of claim 15, wherein said binder or matrix material comprises a polymer, ceramic, glass, metal, carbon, polymeric carbon, asphalt, tar, coal tar pitch, petroleum pitch, mesophase pitch, or a combination thereof.

28. The process as defined in claim 15, wherein said binder or matrix material comprises a polymer selected from the group consisting of polyethylene, polypropylene, nylon, polyesters, polytetrafluoroethylene, polyvinylidene fluoride, fluoro polymers, polyacrylonitrile, acrylic resins, epoxides, polyimide, bismale imide, phenol formaldehydes, vinyl ester, isocyanate resins, and combinations thereof.

29. The process as defined in claim 15, wherein said non-expandable graphite or carbon component is selected from the group consisting of non-expandable natural or synthetic graphite particles, spheroidal graphite particles, meso-carbon micro-beads, carbon blacks, graphite or carbon fibers, graphite or carbon nano-fibers, nano-tubes, and combinations thereof.

30. The process as defined in claim 15, wherein said non-expandable graphite or carbon component further comprises an isotropy-promoting agent selected from the group consisting of glass fibers, ceramic fibers, polymer fibers, metal fibers, metal particles, polymer particles, ceramic particles, glass spheres, organic particles, inorganic particles, and combinations thereof.

31. The process as defined in claim 15, wherein said binder or matrix material comprises a char-yielding material and the process further comprises a step of baking or pyrolyzing said composite at a temperature for a period of time sufficient to convert said char-yielding material into carbon or graphite.

32. The process as defined in claim 31, wherein said char-yielding material is selected from the group consisting of asphalt, tar, sugars, phenolic resins, coal tar pitches, petroleum pitches, mesophase pitches, saccharides, organic polymers, and combinations thereof.

33. The process as defined in claim 15 wherein said exfoliated graphite flakes are obtained from intercalation and exfoliation of a graphite material selected from natural graphite, synthetical graphite, highly oriented pyrolytic graphite, graphite fiber, graphitic nano-fiber, spheroidal graphite, meso-carbon micro-bead, graphite oxide, graphite fluoride, chemically modified graphite, or a combination thereof.

* * * * *